US009894728B2

(12) United States Patent
Shur et al.

(10) Patent No.: US 9,894,728 B2
(45) Date of Patent: Feb. 13, 2018

(54) FLASH LIGHTING WITH OPTIMIZED POWER-DISTRIBUTION

(71) Applicant: RENSSELAER POLYTECHNIC INSTITUTE, Troy, NY (US)

(72) Inventors: Michael Shur, Latham, NY (US); Anqing Liu, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 15/039,101

(22) PCT Filed: Nov. 25, 2014

(86) PCT No.: PCT/US2014/067255
§ 371 (c)(1),
(2) Date: May 25, 2016

(87) PCT Pub. No.: WO2015/081051
PCT Pub. Date: Jun. 4, 2015

(65) Prior Publication Data
US 2017/0181244 A1  Jun. 22, 2017

Related U.S. Application Data

(60) Provisional application No. 61/908,929, filed on Nov. 26, 2013.

(51) Int. Cl.
| H05B 37/02 | (2006.01) |
| H05B 33/08 | (2006.01) |
| G01J 3/50 | (2006.01) |
| G01J 1/42 | (2006.01) |
| G03B 15/02 | (2006.01) |

(52) U.S. Cl.
CPC ............ *H05B 33/0872* (2013.01); *G01J 1/42* (2013.01); *G01J 1/4204* (2013.01); *G01J 3/505* (2013.01);
(Continued)

(58) Field of Classification Search
CPC ............ H05B 33/0872; H05B 33/0854; H05B 37/0218; G01J 1/42; G01J 1/4204; G01J 3/505; G01J 2001/4247; G03B 15/02
(Continued)

(56) References Cited

U.S. PATENT DOCUMENTS 9,574,725 B2 * 2/2017 Pellenc .............. H05B 33/0842
2003/0169345 A1 * 9/2003 Rykowski .............. H04N 5/217
348/207.99
(Continued)

OTHER PUBLICATIONS

Ledigma, "Statistical Approach to Color Quality," May 8, 2013, URL: www.ledigma.lt/technology, p. 1.
(Continued)

*Primary Examiner* — Don Le
(74) *Attorney, Agent, or Firm* — Kevin P. Radigan, Esq.; Heslin Rothenberg Farley & Mesiti P.C.

(57) ABSTRACT

Flash light-generating methods and systems are provided, which, in one aspect, include: obtaining one or more measurements of existing light on or around an illumination target; ascertaining a desired color attribute(s) for a combined light to be provided on the illumination target, the combined light including the existing light and a flash light to be generated; determining a flash light spectral power distribution of illumination which achieves a combined light spectral power distribution of illumination on the illumination target having the desired color attribute(s), the determining using, in part, the measurement(s) of existing light, and the desired color attribute(s) for the combined light; and generating the flash light with the determined flash light spectral power distribution of illumination to provide the combined light on the illumination target having the combined light spectral power distribution of illumination with the desired color attribute(s).

21 Claims, 13 Drawing Sheets

(52) U.S. Cl.
CPC ......... *G03B 15/02* (2013.01); *H05B 33/0854* (2013.01); *H05B 37/0218* (2013.01); *G01J 2001/4247* (2013.01)

(58) Field of Classification Search
USPC ........................................................ 315/152
See application file for complete search history.

(56) References Cited

U.S. PATENT DOCUMENTS

| | | | | |
|---|---|---|---|---|
| 2006/0067668 | A1* | 3/2006 | Kita | G03B 15/05 396/182 |
| 2009/0067828 | A1* | 3/2009 | Ono | G02B 7/102 396/128 |
| 2009/0243493 | A1* | 10/2009 | Bergquist | G03B 15/05 315/149 |
| 2011/0058801 | A1* | 3/2011 | Kageyama | G03B 7/26 396/205 |
| 2014/0333827 | A1* | 11/2014 | Shimada | H04N 5/222 348/371 |

OTHER PUBLICATIONS

International Search Report for PCT/US14/67255 dated Feb. 20, 2015.

\* cited by examiner

FLASH LIGHTING WITH OPTIMIZED POWER-DISTRIBUTION

CROSS-REFERENCE TO RELATED APPLICATION

This application claims the benefit of PCT Application No. PCT/US2014/067255, filed Nov. 25, 2014, which published on Jun. 4, 2015, as PCT Publication No. WO 2015/081051 A1, and which claims the benefit of U.S. provisional patent application Ser. No. 61/908,929, filed Nov. 26, 2013. Each of these applications is hereby incorporated herein by reference in its entirety.

STATEMENT REGARDING FEDERALLY SPONSORED RESEARCH OR DEVELOPMENT

This invention was made with government support under Contract Number EEC0812056, awarded by the National Science Foundation. The government has certain rights in the invention.

BACKGROUND

Pulse or flash lighting may be used, for instance, to provide short-term illumination to a dark scene or to change the quality of an existing light, such as an ambient light, and is widely used in many field, including, for instance, in photography, stage lighting, art illumination, medical illumination, etc. Traditionally, electronic flashes provide light with a satisfactory high intensity and short flash duration. Unfortunately, an illumination target under this type of high-intensity lighting is frequently viewed or imaged as unnatural. Although the flash light provides sufficient illumination to view or image the target, it may also function as a disturbance to the lighting environment, because of its incompatibility with the existing light.

In addition, suitable illumination for viewing or imaging a target may require lighting which facilitates good characterization of the target being illuminated. Such characterization may be completed by measuring optical interaction between the available light and the target. In many cases, existing light is insufficient in terms of illuminance or an ability to reveal the full characteristics of the illumination target in terms of color quality. As a result, a pulse or flash lighting source may be used, which works together with the existing light to shed suitable light on the target, for the purpose of general illumination and/or appropriate characterization of the target. Recently, flash light-emitting diode (LED) illumination has been used as flash sources in, for instance, camera phones with advantages of low voltage operation, high efficiency and small sizes.

SUMMARY OF THE INVENTION

In one aspect, provided herein is a method which includes: obtaining one or more measurements of existing light on or around an illumination target; ascertaining one or more desired color attributes for a combined light to be provided on the illumination target, the combined light comprising the existing light and a flash light to be generated; determining a flash light spectral power distribution of illumination which achieves the combined light spectral power distribution of illumination on the illumination target having the one or more desired color attributes, the determining using, in part, the one or more measurements of the existing light, and the ascertained one or more desired color attributes for the combined light; and generating the flash light with the determined flash light spectral power distribution of illumination to provide the combined light on the illumination target having the combined light spectral power distribution of illumination with the one or more desired color attributes.

In another aspect, a method is provided which includes: obtaining measurements of existing light on or around an illumination target as a function of time; determining multiple flash light spectral power distributions of illumination using, at least in part, the obtained measurements of the existing light on or around the illumination target; and generating multiple flash lights using the determined multiple flash light spectral power distributions to provide a sequence of flash lighting of the illumination target, wherein at least two flash lights of the multiple flash lights have different spectral power distributions of illumination which correlate to variation in the measurements of the existing light on or around the illumination target.

In yet another aspect, a method is provided which includes: providing an illumination system with multiple, predefined, flash light spectral power distributions of illumination for different possible light conditions within which a flash light may be generated by the illumination system; and allowing dynamic selection of a flash light spectral power distribution of illumination from the multiple, predefined, flash light spectral power distributions of illumination for use by the illumination system in generating a flash light to illuminate an illumination target based on an existing light condition on the illumination target.

In a further aspect, a system is provided which includes an illumination system. The illumination system includes: one or more sensors to obtain one or more measurements of existing light on or around an illumination target; a characterization subsystem for ascertaining one or more desired color attributes for a combined light to be provided on the illumination target, the combined light comprising the existing light and a flash light to be generated; an optimization subsystem for determining a flash light spectral power distribution of illumination which achieves a combined light spectral power distribution of illumination on the illumination target having the one or more desired color attributes, the determining using, in part, the one or more measurements of the existing light, and the ascertained one or more desired color attributes for the combined light; and a flash lighting system for generating the flash light with the predetermined flash light spectral power distribution of illumination to provide the combined light on the illumination target having the combined light spectral power distribution of illumination with the one or more desired color attributes.

Further, additional features and advantages are realized by the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed in the claims at the conclusion of the specification. The foregoing and other objects, features, and advantages of the invention are apparent from the following detailed description taken in combination with the accompanying drawings in which:

DETAILED DESCRIPTION OF THE INVENTION

Figure 1A:
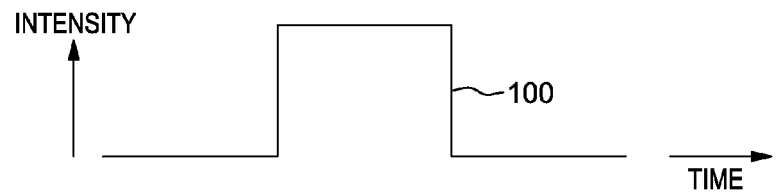
FIGS. 1A-1D depict exemplary waveforms of flash lights with intensity changing with time, in accordance with one or more aspects of the present invention.
Figure 1B:
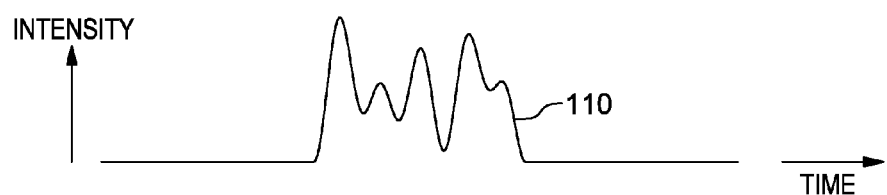

As noted, traditional electronic flashes provide light with a high intensity and standardized color attributes which often result in unnatural imaging of an illumination target. One reason for this is the incorrect illuminance on the target. Often, a flash light is much stronger than necessary, and the high intensity of the flash light may result in a large illuminance contrast in a scene, particularly removing details of the target being illuminated. Another reason for this unnatural viewing or imaging is a mismatch of correlated color temperatures (CCTs) between the flash light and the existing light. Traditional flash lighting for photography produces light with a color temperature of about 5500K, while the color temperature of the existing light on a target often varies. For instance, existing light comprising a combination of artificial light and sunlight with different CCTs can result in a disharmony scene. As an example, human skin under this type of combined light may appear pale. Moreover, a poor color quality of light can cause colors in a scene to become faded or unnatural. Thus, provided herein are novel illumination systems and methods which facilitate, for instance, dynamic optimization of the spectral power distribution of illumination of the flash or pulse light being generated.

The present invention provides a capability to augment existing white light by generating one or more white light flashes having one or more selectable properties. Note that as used herein, "light" is used broadly to refer to any electromagnetic radiation (EMR), and in one or more aspects, is not limited to the visible light spectrum. Advantageously, as described herein, existing light, such as ambient light and/or background light, may be enhanced by the light provided by one or more customized flash lights, and together the existing light and flash light provide an optimized combined light for illuminating details of an illumination target more effectively, for instance, for viewing or imaging applications.

By measuring one or more characteristics of the existing light, one or more attributes of the flash light may be selected or changed, and then combined with the existing light to provide a combined light which locally or globally provides, for example, an optimized spectral power distribution that is adjustable to individual preferences or to specified characteristics, where the spectral power distribution may be achieved by choosing a prescribed range of color quality indexes and/or correlated color. The color quality indexes may include statistical color quality metrics (SCQM) and/or a color rendering index (CRI) implemented with indexes of S (saturation) or D (dulling), in which the SCQM may be a set of metrics including a color fidelity index (CFI), a color saturation index (CSI), a color dulling index (CDI) and a hue distortion index (HDI). For example, in the case of a camera flash light, it may be that low illuminance and low CCT ambient light is measured, and then mixed with an accordingly optimized flash light. The resulting mixed or combined light may be designed with the same illuminance and CCT as, for instance, backlight about the illumination target. In such an implementation, the color rendering properties, such as color saturation level of the combined light, can be adjustable to individual preferences, within the fixed illuminance and CCT. As a result, provided herein in one or more aspects, are a method and flash lighting system which create a customizable combined light on or around an illumination target, by controlling the flash lighting attributes.

Advantageously, advanced light-emitting diode (LED) technology may be used, with the help of intelligent control systems and methods such as described herein to provide light sources with different spectral power distributions (SPD), wherein the intensity of different broadband LEDs can be selectively changed or optimized, and therefore varied to constitute desirable spectra. This flexibility allows for lighting systems and methods such as disclosed herein, with high-color quality and/or tunable spectral power distributions. A target illuminance and color temperature may be achieved by a combination of existing light and an optimized flash light spectral power distribution. In addition, the flash lighting system, or flash source, is able to provide various visual effects on the object being viewed or imaged, in accordance with different lighting selections or needs. Such visual effects could be quantified by color quality indexes, together with illuminance and CCT, as described herein.

Advantageously the spectral power distribution of the combined light on an illumination target may be customized by matching a prescribed illuminance level and CCT, and by achieving selected, preset visual effects, such as those described by a range of color quality indexes. As a result, disclosed herein are processes for generating locally and/or globally optimized spectra using existing light, such as existing ambient and/or background light, and the adjustable flash light. Note that as used herein, "background light" and "backlight" are used interchangeably, and the term "ambient light" generally refers to light in front of an illumination target which, for instance, directly illuminates the illumination target, and "background light" refers to or includes light in back of the illumination target, that forms the background of the target. In one possible example, the ambient light may comprise light from one or more indoor sources, and the background light might comprise outdoor sunlight, for instance, entering a space containing the illumination target through one or more windows.

Reference is made below to the drawings, where the same or similar reference numbers used throughout different figures designate the same or similar components.

Figure 1C:
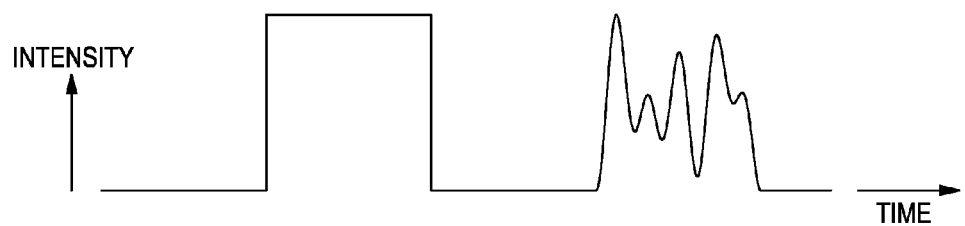
Figure 1D:
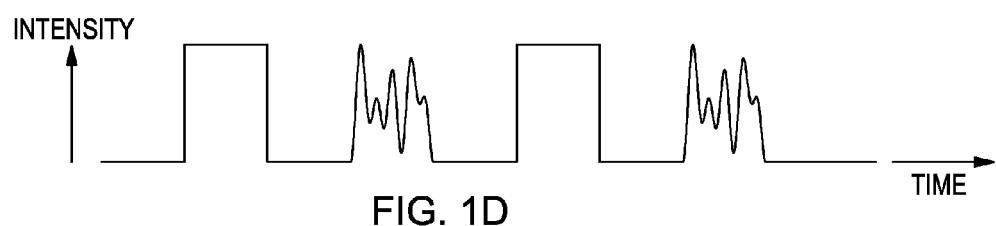

By way of example, FIGS. 1A-1D depict various examples of flash light intensity changing with time. In FIG. 1A, a waveform 100 is illustrated of a flash light comprising a rectangular pulse, and in FIG. 1B, a waveform 110 is shown comprising a flash light with an arbitrary intensity. In FIG. 1C, a sequence of flash lights is illustrated, comprising (by way of example only) two pulses, one with a rectangular intensity waveform, and the other with an arbitrary intensity waveform. FIG. 1D depicts an example of a periodic sequence of flash lights comprising, by way of example, the rectangular and arbitrary pulse sequence of FIG. 1C.

Figure 2A:
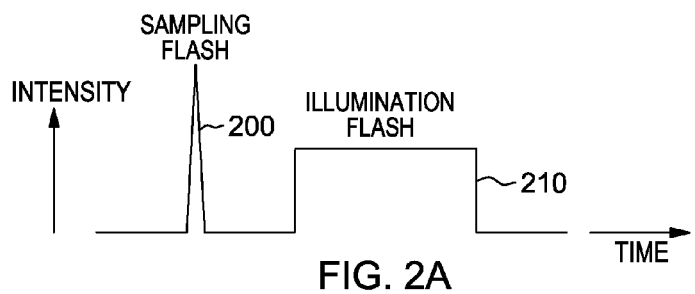
FIGS. 2A-2D depict further exemplary waveforms of flash lights with intensity changing with time, for instance, for different flash lighting purposes, in accordance with one or more aspects of the present invention.

The waveform of the flash light may be adjusted to achieve different goals. FIGS. 2A-2D depict different flash waveforms, and waveform sequences. The sampling flash, or pulse, generally has a higher intensity and shorter duration than the accompanying illumination flash. In FIG. 2A, a flash sequence is illustrated, where a brief sampling flash 200 appears first, followed by an illumination flash 210. Between the two flashes, a time duration is provided sufficient, for instance, for the illumination system to characterize the target being illuminated. Note that the term "target" is used generically herein to refer to any type or combination of person, place, or thing, such as one or more people or things, etc., being illuminated, and could include one or more static targets or targets moving or changing in time.

Figure 2B:
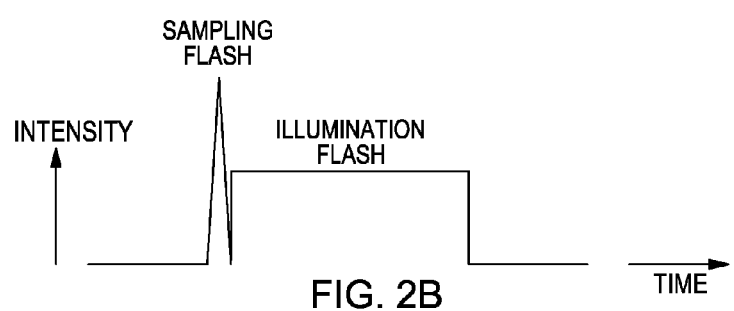
Figure 2C:
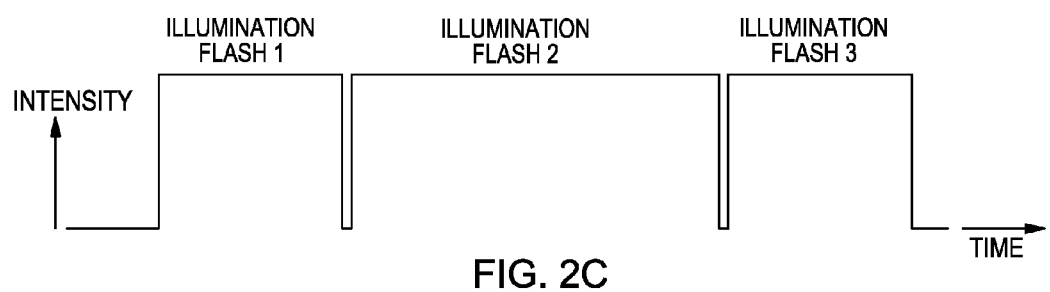
Figure 2D:
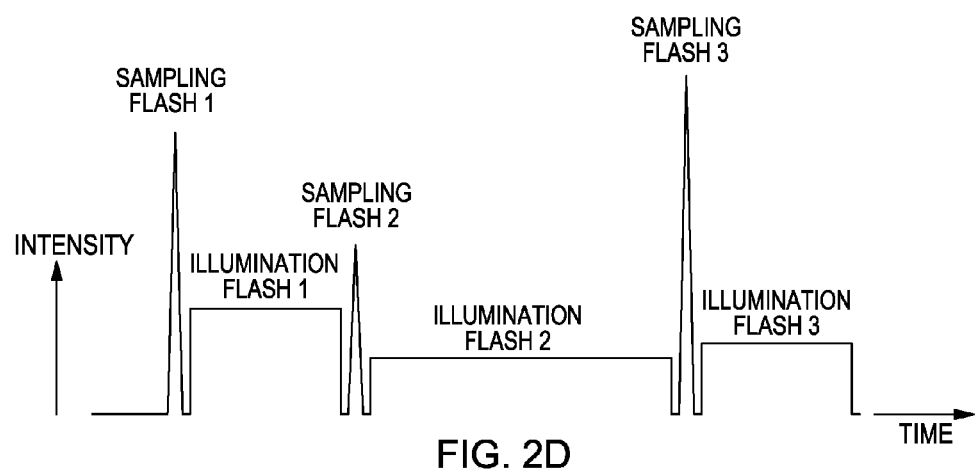

As an alternative example, FIG. 2B illustrates a sampling flash and illumination flash sequence where the sampling flash appears first, and the illumination flash follows substantially immediately. In FIG. 2C, an illumination flash sequence is illustrated, where the illumination sequence comprises multiple illumination flashes 1, 2 & 3, with the same or different pulse durations. By way of example, FIG. 2C illustrates two shorter-duration illumination flashes 1 & 3 bookending a longer-duration illumination flash 2. In FIG. 2D, a sampling flash and illumination flash sequence is illustrated, where the sequences of, for instance, FIGS. 2A and/or 2B, may be repeated periodically. The sampled information of each sampling pulse may be provided as feedback to the illumination system, and the corresponding illumination flash follows. In this manner, each sampling flash and illumination flash may have different intensity and time durations.

Figure 3A:
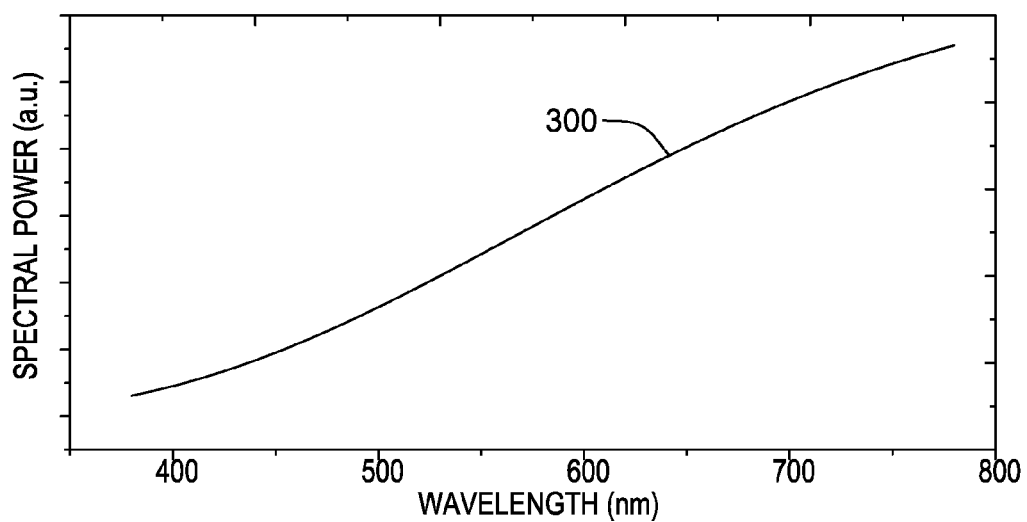
FIGS. 3A & 3B depict illustrative spectral power distributions for sampling flashes or illuminating flashes, in accordance with one or more aspects of the present invention.
Figure 3B:
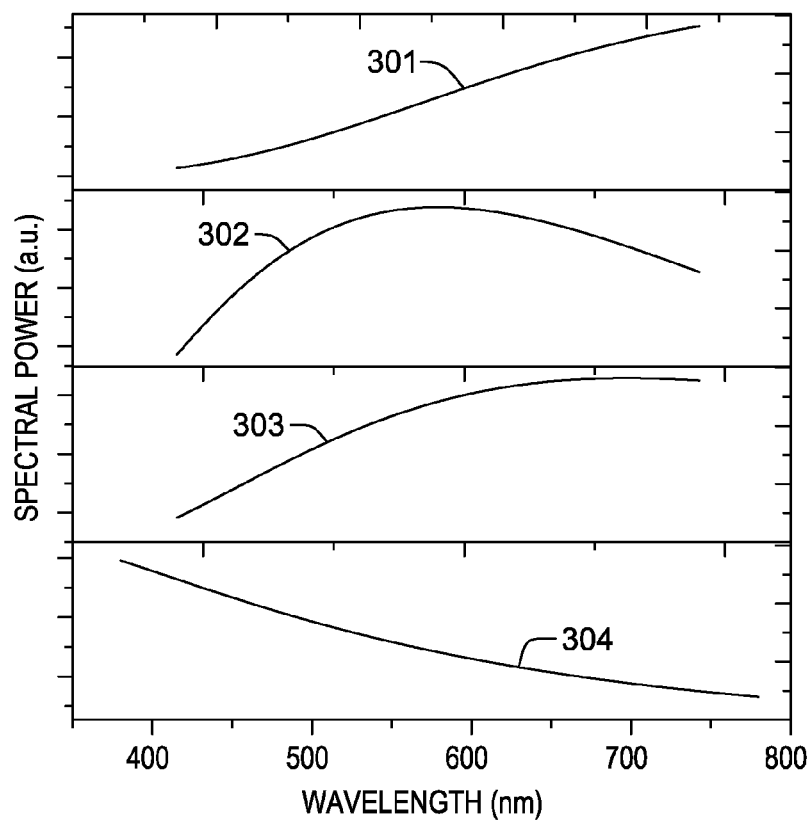

As discussed herein, the spectral power distribution (SPD) of the flash light can be customized and the same for a series of flashes, or may vary, for instance, from flash-to-flash. FIG. 3A illustrates an exemplary spectral power distribution for a light flash, such as a sampling flash. The depicted spectral power distribution 300 is, for example, of a black body at 3000K. As understood, a black body is an idealized, physical body that absorbs all incident electromagnetic radiation, regardless of frequency or angle of incidence. This type of light has high color rendition quality, where colors under the light spectrum are appropriately revealed. FIG. 3B illustrates four spectral power distribution graph examples for an illumination flash, which may be generated. These spectral power distributions 301, 302, 303, 304 are of black bodies at 3000K, 5000K, 4000K, and 10000K, respectively. The depicted spectral power distribution progression of FIG. 3B is coincident with, for instance, CCT change of sunlight within a typical day, corresponding to morning, midday, afternoon, and dusk, respectively. With a room lacking daylight, one or more of these illumination flashes could be used to provide a desired artificial daylight.

As indicated above, in one or more aspects, provided herein are systems and methods for generating customized light flashes. Specifically, flash light from a source, such as multiple, colored light-emitting diodes (LEDs), may be automatically adjusted to provide an optimized, combined spectral power distribution on or around an illumination target. The desired, combined spectral power distribution of the combined light may be determined, in one embodiment, by matching a prescribed illuminance level and CCT, and achieving preset visual effects prescribed by a range of color quality indexes. Thus, systems and methods are provided herein which generate locally or globally optimized spectra using existing light, for instance, current ambient and background light, and a specially-controlled flash light.

Figure 4:
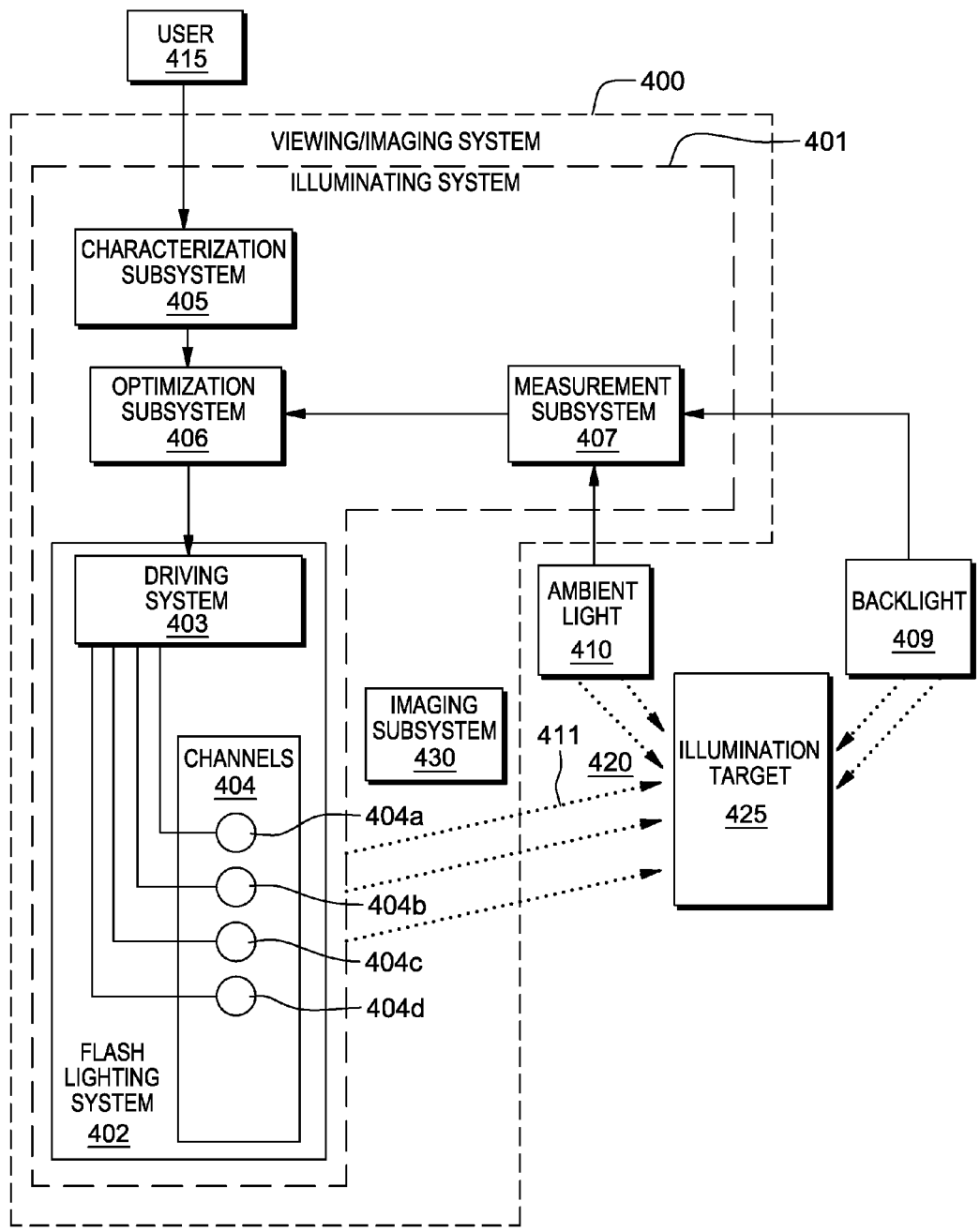
FIG. 4 depicts one embodiment of a system for generating an optimized flash light(s), in accordance with one or more aspects of the present invention.

FIG. 4 depicts an illustrative viewing or imaging system 400 with an illumination system 401 for generating an optimized flash light 411 to produce a desired combined light 420 on or around an illumination target 425. In one embodiment, the combined light 420 includes existing light comprising, for example, ambient light 410, and background light 409, as well as flash light 411 generated by a flash lighting system 402 of illumination system 401. As one example, the flash light 411 from illumination system 401 may be an optimized light-emitting diode (LED) flash light used to supplement existing light illuminating target 425. The imaging system 401 includes a characterization subsystem 405, an optimization subsystem 406, and a measurement subsystem 407, as well as the flash lighting system 402. Measurement subsystem 407 may comprise sensors configured to obtain one or more measurements of existing light on or around target 425. These one or more measurements may include data on ambient light 410 and background light 409, as well as one or more characteristics of target 425. Characterization subsystem 405 accepts (in one embodiment) a user's 415 selection of one or more desired characteristics of combined light 420 on or around target 425. Optimization subsystem 406 collects information from measurement subsystem 407 and characterization subsystem 405, and determines desired flash light 411 attributes to be generated by illumination system 401, and in particular, flash lighting system 402.

Flash lighting system 402 includes, in one embodiment, a driving system 403 and an emission system 404. Driving system 402 can provide current parameters, or the like, to emission system 404 in order to generate flash light 411. Emission system 404 can include, in one implementation, one or more light-emitting elements 404a, 404b, 404c, 404d, which emit "light", which as noted, is broadly used herein to be any desired electromagnetic radiation. When a plurality of emitting elements are provided within emission system 404, the light emitted by each element may be mixed within illumination system 401 to generate flash light 411. In one example, the emitting elements are light-emitting diode channels, which include one or more color light-emitting diodes. Thus, the output of each light-emitting diode in the light-emitting diode channels may be mixed within the illumination system 401 to generate a desired light-emitting diode flash light 411. As noted, and as will be understood by one skilled in the art, flash light 411 could comprise one or more wavelengths within the visible light spectrum, or one or more wavelengths of various other spectra including, for example, the x-ray spectrum, infrared spectrum, microwave spectrum, millimeter spectrum, and terahertz spectrum. As a result, each emitting element could comprise any type of emitting device capable of generating light (i.e., electromagnetic radiation) 411 having the desired wavelength.

As mentioned, illumination system 401 can adjust the flash light 411 to include one or more desired attributes. In one embodiment, driving system 403 adjusts operation of one or more emitting elements 404a, 404b, 404c, 404d, to alter the resulting flash light 411. For example, driving system 403 provides an adjustable driving current to each emitting element 404a, 404b, 404c, 404d (e.g., light-emitting diode). In this case, driving system 403 could provide a distinct driving current to each emitting element to allow for, for instance, independent adjustment of each emitting element. However, it should be understood that driving system 403 could provide the same driving current to a plurality of emitting elements 404a, 404b, 404c, 404d, allowing for ready adjustment of the plurality of emitting elements as a group, or as a subgroup. For instance, at least two subgroups of the plurality of emitting elements could be formed, with each subgroup receiving a different driving current, by way of example. In order to adjust one or more emitting elements 404a, 404b, 404c, 404d, driving system 403 can adjust a magnitude of the driving current and/or a pulse duration of the driving current, in any known fashion. For example, driving system 403 could adjust one or more parameters that alter the operation of an emitting element.

Illumination system 401 could be configured to allow adjustment of one or more other attributes of flash light 411. For example, driving system 403 could adjust, or be controlled to adjust, one or more of the wavelength, magnitude, etc., of the light generated by each emitting element. Further, illumination system 401 could be configured to emit flash light 411 for use in illuminating target 425 for various applications. In each application, one or more characteristics of target 425 may differ, making the desired spectral power distribution of light 411 different for the different applications. In this case, illumination system 401 could adjust the spectral power distribution of light 411 based, for instance, on one or more characteristics of target 425 alone, or in combination with one or more measurements of the existing light around target 425.

In this regard, illumination system 401 includes measurement subsystem 407, which may obtain, in one or more embodiments, one or more characteristics of target 425, using any of various known solutions. For example, a user 415 could enter one or more characteristics for target 425 to be measured, and/or select an application from which target 425 characteristics can be determined. Additionally, measurement subsystem 407 could include one or more sensing elements for sensing one or more properties of target 425. Based on the sensed property(ies), measurement subsystem 407 could determine the characteristic(s) of target 425.

By way of example, the sensed property could be based on emission from target 425, a reflection from target 425, or some combination thereof. For example, illumination system 401 could provide target 425 with a flash light 411 that comprises a default attribute, for example, a default spectral power distribution. Measurement subsystem 407 could sense light that reflects off target 425 to obtain one or more properties thereof. Based on the reflected light, measurement subsystem 407 could determine the target 425 characteristic(s). Alternatively, it is understood that the sensed light could comprise radiation that is emitted from target 425. In this case, illumination system 401 need not generate light in order to obtain the one or more properties of target 425. In one embodiment of the concepts disclosed herein, measurement subsystem 407 might comprise a spectrometer detection unit that measures reflective and/or emitting characteristic(s) of target 425. For instance, measurement subsystem 407 could include a plurality of sensing elements of the spectral power distribution.

In a further aspect, the flash or augmenting light 411 generated by illumination system 401 may be based on the existing light provided by ambient light 410 and/or background light or backlight 409, as well as the characterization of target 425, to produce the desired combined light 420 on or around target 425. The desired, combined light may be ascertained through processing within optimization subsystem 406, combined with the measurement data on the existing light (including, for instance, ambient light 410 and backlight 409), which may be obtained via measurement subsystem 407.

In addition, characterization subsystem 405 may be employed to provide characteristics for the desired, combined light 420. This may be achieved, for instance, by matching the combined light 420 with the backlight 409 using the same illuminance and CCT, along with user 415 selecting one or more desired visual effects, such as color fidelity, color saturation, and/or color dulling, described by one or more color quality indexes. The chosen visual effects may be application-dependent, or individual preference of user 415.

Once obtained, measurement subsystem 407 and characterization subsystem 405 provide the above-noted measurements and characterizations to optimization subsystem 406, which can use any solution now known or later developed for determining the desired flash light 411. Optimization subsystem 406 can determine any desired attribute of light 411 based on, for instance, measurements obtained from measurement subsystem 407, and the characterizations from characterization subsystem 405. For example, a desired spectral power distribution of light 411 can be determined. Similarly, an intensity, time dependence, and/or polarization for light 411 could be determined. It should be understood that optimization subsystem 406 could determine a single desired attribute (e.g., spectral power distribution), or multiple desired attributes (e.g., spectral power distribution, intensity, time dependence, polarization, etc.). The attribute(s) could be selected to provide the desired characterization for the combined light 420 on or around target 425.

Once determined, optimization system 406 provides the solution, such as one or more desired flash light attributes, to flash lighting system 402 (e.g., to driving system 403) for use in generating flash light 411. To this extent, optimization subsystem 406 could automatically update the desired attribute(s) based on changing characterizations and measurements provided by characterization subsystem 405 and measurement subsystem 407, respectively. In such a case, light 411 could be quickly adjusted to include the desired changes. As a result, a highly responsive illumination system 401 may be provided for illuminating target 425. In one example, flash light 411 is produced by multiple emitting elements, such as multiple light-emitting diodes, with the emitted flash light 411 mixing with existing light, comprising ambient light 410, to build the combined light 420 on or around target 425.

Viewing/imaging system 400, comprising illumination system 401, could be or could include any type of imaging device or system, such as a camera, a phone camera, a video recorder, a medical imaging system, etc., wherein, for example, the combined light 420 may be sensed or utilized by an imaging subsystem 430 thereof to build up, for instance, a photograph or other type of image.

As noted, optimization subsystem 406 could use any solution that is now known or later developed for determining the corresponding flash light 411. For example, the following multi-objective cost function could be used to find a solution:

$$\min_{s_1, s_2 \ldots s_m} \sum_i \omega_i P_i(r_1, r_2 \ldots r_m; s_1, s_2 \ldots s_n)$$

Where $P_i$ are parameters used to characterize the combined light 420, which are obtained from the characterization subsystem 405 and the measurement subsystem 407, as previously mentioned. Parameters $P_i$ may determined by the characteristics of ambient light 410, $r_1, r_2 \ldots r_m$, from the measurement subsystem 407 and the characteristics of the flash light 411, $s_1, s_2, \ldots s_n$, which is a solution that optimization subsystem 406 is to determine. It should be understood that the above cost function could be subjected to any set of constraints, include but not limited to a fixed illuminance and CCT of the combined light 420, following (for instance) the real-time backlight 409, the energy consumption of the illumination system 401 and ranges of parameters $P_i$. In one or more embodiments, the constraints may be selected by user 415 via characterization subsystem 405.

It should be understood that one or more of the systems or subsystems described above in connection with FIG. 4, or below with reference to FIG. 10, could incorporate and/or be implemented using any combination of hardware and/or software. To this extent, one or more computing devices could be used, which could comprise a general purpose computing device, a specific-use computing device, or some combination thereof. As noted in the art, each computing device could include a central processing unit (CPU), memory, and input/output (I/O) interface. The CPU performs operations based on computer program instructions and/or data stored in the memory, while the I/O interface provides an interface for transferring data between the computing device and one or more external devices, such as emitting elements, sensing elements, and/or a user.

Any type of computing device, or other apparatus suited for carrying out the methods discussed herein, is suitable. A typical combination of hardware and software could be a general purpose computer system with a computer program that, when loaded and executed, carries out the respective methods described herein. Alternatively, a specific-use computer (e.g., a finite state machine), containing specialized hardware for carrying out one or more of the functional tasks of the invention, could be utilized. One or more of the various systems discussed herein could be embedded in a computer program product, which comprises all the respective features enabling the implementation of the methods described herein, and which when loaded in the computer system, is capable of carrying out these methods. Computer programs, software programs, programs, or software, in the present context, mean any expression, in any language, code, or notation, of a set of instructions intended to cause a system having an information processing capability to perform a particular function, either directly or after either or both of the following: conversion to another language, code, or notation; and/or reproduction in a different material form.

Figure 5:
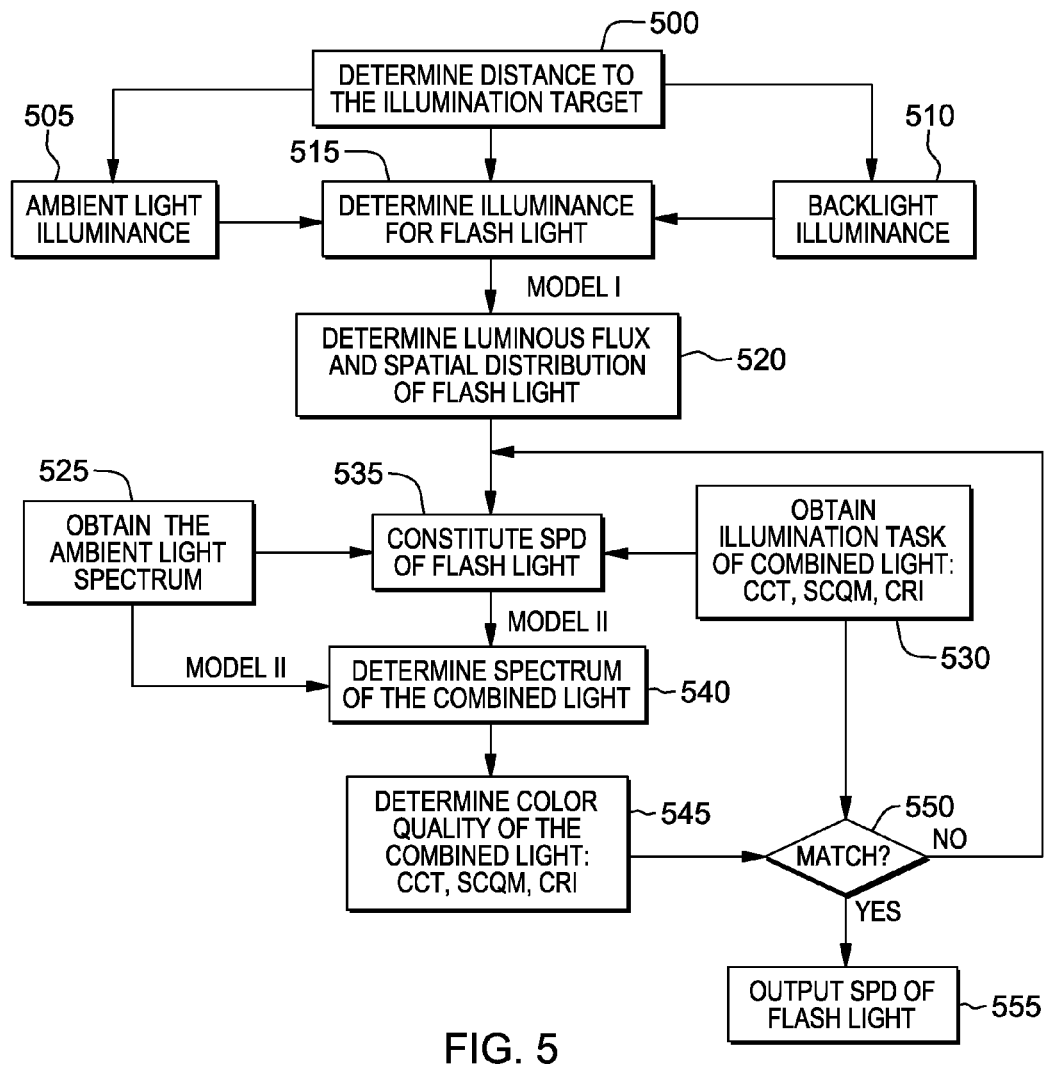
FIG. 5 depicts one embodiment of a process for optimizing a flash light spectral power distribution (SPD) of illumination, in accordance with one or more aspects of the present invention.

FIG. 5 depicts one embodiment of processing which may be implemented by an optimization subsystem, such as optimization subsystem 406 of FIG. 4 for determining, by way of example, an optimized spectral power distribution for a flash light to be generated, according to inputs from input measurement and characterization subsystems. Initially, distance between the flash light source, i.e., the illumination system, and the target to be imaged or viewed, may be determined 500. The illuminance level of ambient light on or around the target may be ascertained 505, as well as the illuminance level of the background light on or around the illumination target 510. This information may be obtained from a measurement subsystem, such as described above in connection with FIG. 4. The collected distance information, ambient light illuminance and background light illuminance may then be used to determine a desired flash light illuminance to be provided on the target 515. Knowing the distance between the target and the flash lighting system, and the illuminance to be provided from the flash light, the luminous (i.e., the luminous flux and spatial distribution) of the flash light can be determined 520. The luminous flux of the flash light serves as a constraint for the flash light spectral power distribution constitution. Another constraint may be the overall correlated color temperature (CCT) for the combined light to be provided. As noted, the combined light will be a mixture of the flash light and the ambient light shed on the target. The CCT of the combined light may be constrained to match the CCT of the background light, which may be provided to the optimization subsystem via the measurement subsystem described above. The illumination task for the combined light may further include information obtained from the characterization subsystem noted above.

As noted, in one or more embodiments, the visual effect task may be quantified by color quality indexes, including statistical color quality metrics (SCQM), and implemented color rendition index (CRI). In the SCQM, a combination of the color saturation index (CSI) and color fidelity index (CFI) describe the color saturation ability of the illumination, and a combination of the color dulling index (CDI) and CFI describe the color dulling of the illumination. Similarly, the color rendition indexes implemented with saturation (S)

and dulling (D) indicate the saturation and dulling ability of the illumination, respectively. This collected information 530 is provided to the optimization system, along with the spectrum of the ambient light measured by the measurement system 525. One possible spectral power distribution for the flash light is constituted 535 by, in part, selecting an intensity for each emitting element, such as each color light-emitting diode of the flash lighting system. The one possible flash light spectral power distribution is mixed with the spectral power distribution of the ambient light to obtain one possible combined light spectral power distribution 540, which is evaluated in terms of CCT, SCQM, and CRI 545. These results are compared with the target color attributes 550. If the comparison is sufficiently close to defined a match, for instance, within a set 1-5%, the optimization is finished, and the constituted flash light spectral power distribution is output as the ascertained or proper solution 555 for using in generating the flash light. Otherwise, if the difference between the result and expectation are insufficiently close, processing reconstitutes the spectral power distribution of the flash light to obtain a different possible flash light spectral power distribution 535, which is then used to generate a new possible combined light spectral power distribution 540 for analysis and comparison to the target task attributes. This process repeats until a proper solution is found, resulting in determination of a flash light spectral power distribution of illumination which achieves the combined light spectral power distribution of illumination on the object having the one or more color attributes.

In the above process, two estimations or estimation models may be used. The first one, Model I in FIG. 5, is estimating the resulting illuminance on the target from the illumination of the flash light to determine the luminous flux and spatial distribution of the flash light. The second one, Model II in FIG. 5, is estimating the relative spectral counts of the combined light knowing the ambient light spectral power distribution and flash light spectral power distribution. The following two mathematical models may be used to implement these estimations.

Model I

This model determines illuminance (lux) on a surface according to luminous flux (lumen) of a light source. Assume, by way of example, that the light source has a beam angle of $2\theta$, and the distance between the light source and the measured area is r. The three-dimensional angular span for an apex angle, using $\Omega$ for the angular span (in steradian), may be expressed as:

$$\Omega = 2\pi(1 - \cos 2\theta/2)$$

The area effected can be approximated as:

$$A \approx \Omega r^2$$

Thus, the illuminance $E_v$ on the surface can be expressed by luminous flux $\Phi_v$ as:

$$E_v = \frac{\Phi_v}{A} = \frac{\Phi_v}{2\pi r^2 \left(1 - \cos\frac{2\theta}{2}\right)}$$

For a light source with a beam angle of $2\theta = 120°$, 0.5 m away from the measured surface, the relation between illuminance and luminous flux may be defined:

$$E_v = \frac{\Phi_v}{0.25\pi}$$

Model II

This model constitutes the spectral counts for a combined light, when illuminance (lux) on a surface and spectral counts for the sources are known.

Notation:

$S_1(\lambda)$, $S_2(\lambda)$—Spectral counts for each light source, in a.u.;

$J_1(\lambda)$, $J_2(\lambda)$—Spectral power distribution (SPD) of each light source (power per unit wavelength), in watts per meter;

$F_{v1}$, $F_{v2}$—Luminous flux for each light source on a measured surface, in lumen;

$E_{v1}$, $E_{v2}$—Total illuminance of each light source on a measured surface, in lux; and $\bar{y}(\lambda)$—CIE 1931 luminosity function.

For calculation of color quality and CCT, it is only necessary to know the shape of the spectrum of the combined light, while the real SPD is not needed. To do this, the relative spectral intensity of the different sources, $J_1(\lambda)/J_2(\lambda)$ in this two-source (ambient and flash) case are to be determined.

For a given surface, $$\frac{E_{v1}}{E_{v2}} = \frac{F_{v1}}{F_{v2}} \tag{1}$$

Given the definition of the luminous flux as, $$F_{v1,2} = 683 \text{ lm/W} \cdot \int_\lambda J_{1,2}(\lambda)\bar{y}(\lambda)d\lambda, \tag{2}$$

then equation (1) becomes:

$$\frac{E_{v1}}{E_{v2}} = \frac{\int_\lambda J_1(\lambda)\bar{y}(\lambda)d\lambda}{\int_\lambda J_2(\lambda)\bar{y}(\lambda)d\lambda} \tag{3}$$

On the other hand, the SPD of a source is proportional to its spectral counts:

$$\begin{cases} J_1(\lambda) = k_1 S_1(\lambda) \\ J_2(\lambda) = k_2 S_2(\lambda) \end{cases}, \tag{4}$$

in which $k_1, k_2$ are scalars having the same units of $J_1(\lambda)$, $J_2(\lambda)$.

Inserting equation (4) to (3), yields:

$$\frac{k_1}{k_2} = \frac{E_{v1}}{E_{v2}} \frac{\int_\lambda S_2(\lambda)\bar{y}(\lambda)d\lambda}{\int_\lambda S_1(\lambda)\bar{y}(\lambda)d\lambda} \tag{5}$$

Combining equations (4) and (5) gives $$\frac{J_1(\lambda)}{J_2(\lambda)} = \frac{E_{v1}}{E_{v2}} \frac{S_1(\lambda)}{S_2(\lambda)} \frac{\int_\lambda S_2(\lambda)\bar{y}(\lambda)d\lambda}{\int_\lambda S_1(\lambda)\bar{y}(\lambda)d\lambda} \tag{6}$$

The above equation (6) sets forth a spectral constitution approach for a combined light defined by two sources (such as the ambient light and flash light discussed herein). For light combined by more than two sources, the problem can be solved by applying the above procedures multiple times.

Figure 6:
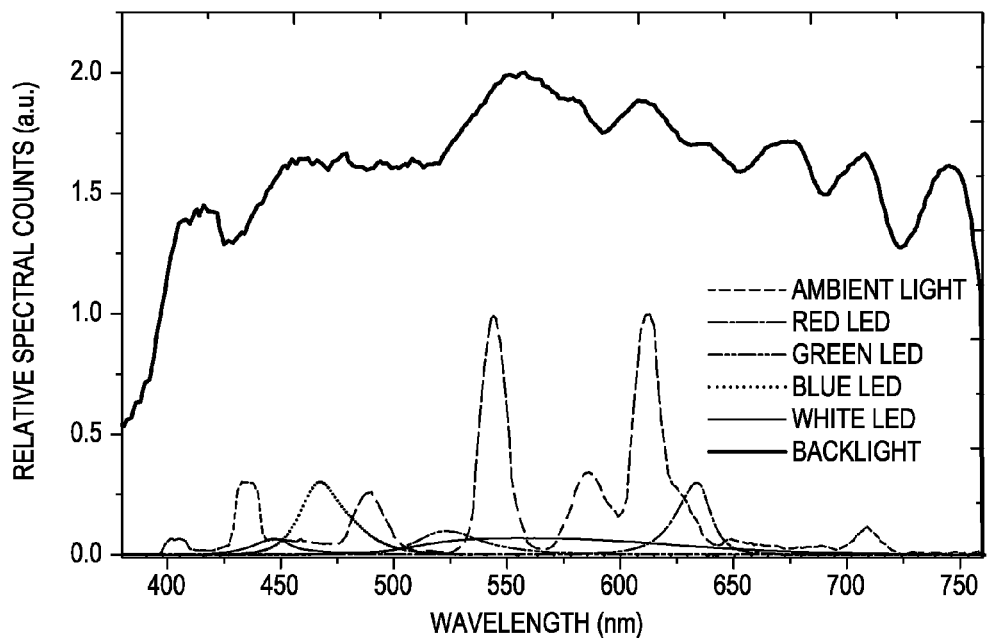
FIG. 6 graphically illustrates exemplary spectra for measured ambient light and measured backlight, as well as spectra for color light-emitting diodes (LEDs) used in one embodiment of a flash lighting system, in accordance with one or more aspects of the present invention.

FIG. 6 shows exemplary spectra for measured ambient light and background light, as well as spectra for the emitting elements (e.g., color LEDs) used in the illumination system. The background and ambient light spectrum were measured near a window (at approximately 2:00 PM). During the measurement of backlight, a sensor was facing the window. When measuring ambient light, the sensor was facing the room, at the same location. In this example, the background light was measured to have an illuminance of 737lx, and a CCT of 4967K. The ambient light was measured with an illuminance of 121lx, and a CCT of 3177K. The spectral counts in FIG. 5 may be scaled according to their illuminance, as describe in the above mathematical Model II. The background light is almost pure daylight, and the ambient light spectrum indicates that it is a mixture of outdoor daylight and indoor fluorescent light, with the fluorescent light being the major component. The first task of the flash light is to compensate the ambient light so that the resultant combined light obtains, for instance, the same illuminance and CCT as the background light.

The flash light may be designed to operate a specified distance (e.g., 3 meters) away from the target and have a beam angle of, for instance, 120 degrees. Red, green, blue and phosphor converted white LEDs may be used to constitute the desired flash light, with the intensity of each LED channel being changeable. The illuminance of the flash light can be estimated by Model I above. Once the illuminance of the flash light and the ambient light are known, then their spectra can be scaled in the same frame using Model II above.

In one embodiment, the emitting elements may comprise color LEDs, such as those available from Phillips LumiLEDs, of San Jose, Calif. (USA). In one specific implementation, the LEDs may be specified to work at 350 mA, with a peak wavelength and luminous flux for each LED source presented in Table I below.

TABLE I

Characterization of light sources

| Light source | Peak wavelength (nm) | Luminous flux (lumen) |
|---|---|---|
| One Red LED | 632 | 35.1 |
| One Green LED | 524 | 22.2 |
| One Blue LED | 469 | 56.6 |
| One White LED | — | 121.0 |

The optimization procedures of FIG. 5 may be quantified by the following mathematical expression:

$$\underset{u_{1,2,3,4} \geq 0}{\text{minimize}} \gamma, \quad (7)$$

$$\text{subject to} \begin{cases} [-CFI(u)] - \omega_1 \gamma \leq -100 \\ [-CSI(u)] - \omega_2 \gamma \leq -100 \text{ or } [-CDI(u)] - \omega_2 \gamma \leq -100 \\ E_{ambient} + \sum_{i=1}^{4} u_i E_i = E_{backlight} \\ \|(x(u), y(u)) - (x_0, y_0)\| < 0.01 \\ HDI(u) \leq 50 \end{cases}$$

where:
u—A vector indicating intensity percentage of each of the emitting element channels. $u_1$, $u_2$, $u_3$, and $u_4$, represent red, green, blue and white channels, respectively, in one embodiment. When $u_i$ is greater than 1, more than one LED in this color is needed. For example, if $u_2$=2.4, then at least 3 green LEDs are required, two of which may work at full intensity, and one of which may be dimmed to 40% of full intensity. Alternatively, the 3 LEDs could be dimmed to 80% of full intensity.

CFI, CSI, CDI, HDI—Color quality indexes: Color Fidelity Index, Color Saturation Index, Color Dulling Index and Hue Distortion Index, respectively. An HDI<50 constrains the hue distortion level of the target combined light within a low level.

E—Illuminance. $E_{ambient}$ stands for the measured illuminance of the ambient light. $E_i$ represents the calculated illuminance of each emitting element (e.g., LED) channel, presented in Model I above. $E_{backlight}$ stands for the measured illuminance of the background light.

x, y—Color coordinates in CIE-xy color space for the constituted SPD of the combined light.

$x_0$, $y_0$—Color coordinates in CIE-xy color space for backlight. For example, ($x_0$, $y_0$)=(03463, 0.3550) may be obtained from the measured spectral power distribution of the background light. In order to "match" the CCT of the combined light to the CCT of the backlight, the color coordinates might have a difference of, for instance, less than 0.1. Such a tolerance fulfills the energy star requirements for integral LED lamps.

γ—optimization cost, which indicates the slackness of the target combined light solution.

$\omega_1$, $\omega_2$—weighting vectors, which enable the measure of the relative tradeoffs between objectives.

Equation (7) describes an expression to find non-inferior solutions that perform a tradeoff between CFI and CSI or between CFI and CDI. In this way, the color saturation and de-saturation visual effects may be fully tunable.

Figure 7:
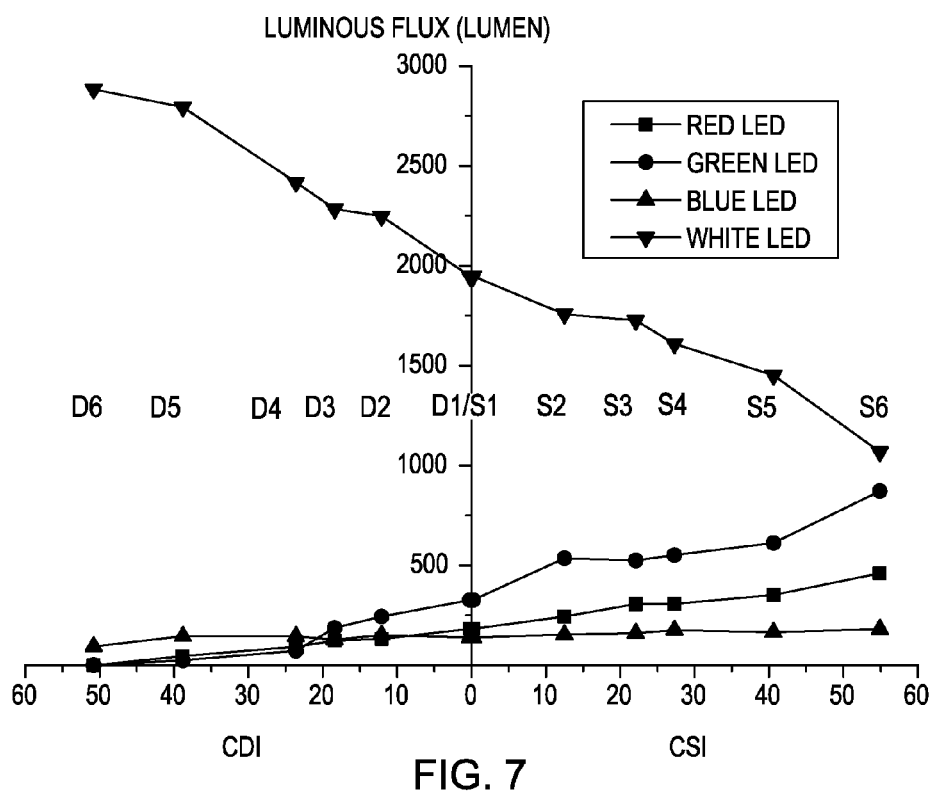
FIG. 7 depicts exemplary optimized results in terms of luminous flux of each light-emitting diode channel of a flash lighting system, in accordance with one or more aspects of the present invention.

FIG. 7 depicts an example of the optimization results in terms of luminous flux for each of the four LED channel example noted above. For the CFI vs. CDI optimization, 6 solutions are identified. They are labeled D6, D5 . . . D1/S1 in FIG. 7, from highest to lowest color-dulling ability. For the CFI vs. CSI optimization, an additional 6 solutions are identified, which are identified by D1/S1, S2 . . . S6, from lowest to highest color saturating ability. The two optimization share one same solution, D1/S1, in which CSI and CDI are both close to zero, i.e., the colors are presented in a high fidelity way and almost no colors under this illumination will be rendered as saturated or de-saturated. For all solutions, the constraints of CCT and illuminance are fulfilled.

Figure 8:
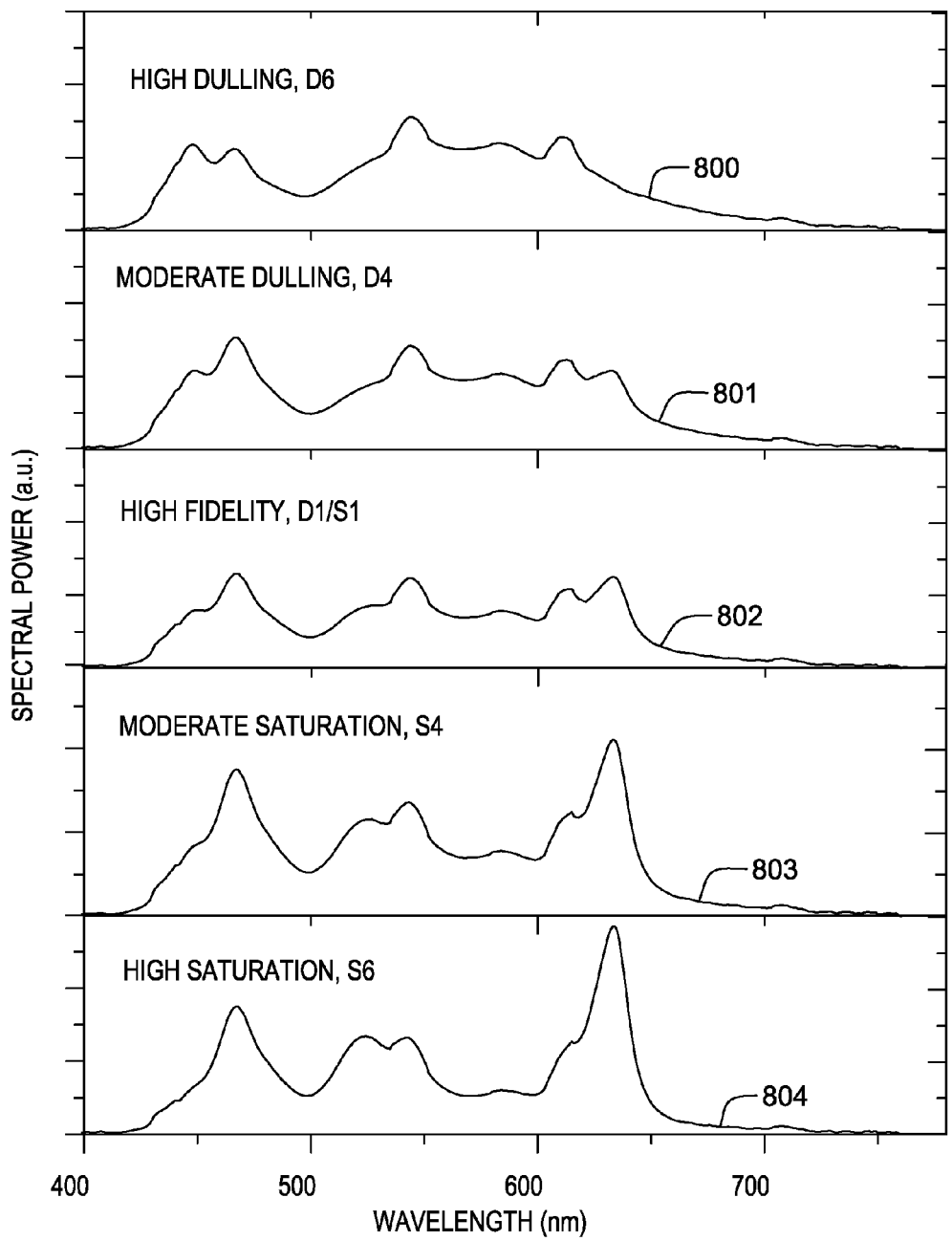
FIG. 8 depicts five of the eleven optimized SPD results of FIG. 7, in accordance with one or more aspects of the present invention.

FIG. 8 demonstrates 5 of the 11 optimized spectral power distributions (SPDs), identified as 800, 801, 802, 803 & 804. These graphs depict the combination between the optimized flash light SPD and the ambient light SPD, as proved by the spectral peaks of color LEDs and of the ambient light. They correspond to different color rendition properties, changing gradually from highest color-dulling to highest color-saturating, where the middle graph represents the highest color fidelity.

Figure 9A:
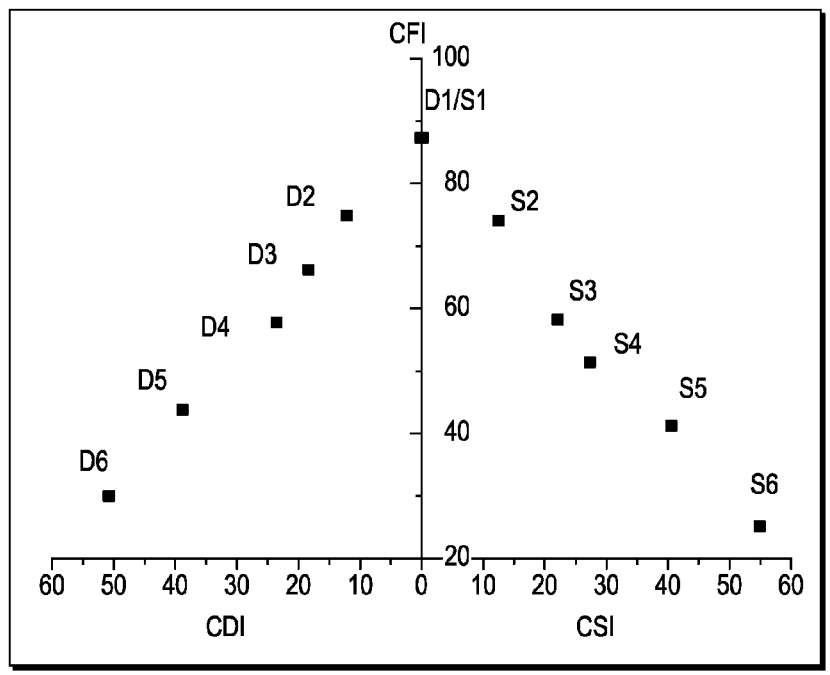
FIG. 9A depicts exemplary statistical color quality metric (SCQM) scores for the optimized flash lights combined with ambient light, in accordance with one or more aspects of the present invention.
Figure 9B:
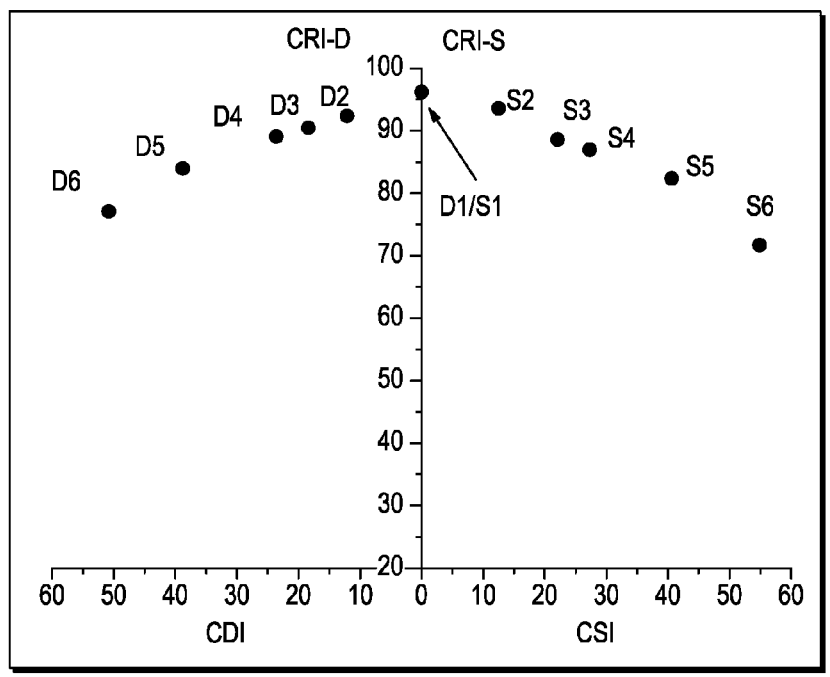
FIG. 9B depicts exemplary color rendition index (CRI) scores for the optimized flash lights combined with ambient light, in accordance with one or more aspects of the present invention.

FIG. 9A and FIG. 9B demonstrate color quality index scores (CFI, CRI-D, CRI-S) for the optimized flash light combined with the ambient light. The results form a set of Pareto-fronts, which means that at each point, the two scores cannot be improved simultaneously. The maximum values of CSI, CDI and CFI are 54.9, 50.8 and 87.3, respectively. This result indicates a large color saturation and color desaturation tuning range. As an example, in all tuning points, the CCT is assumed to be fixed at 4967K, the illuminance is fixed at 737lx, and the HDI scores are less than 50. It is to be noted that for solutions from the CFI vs. CSI (the right-hand halves of FIGS. 9A & 9B), the scores of CDI are all lower than 2, which means that all solutions provide non-color-dulling light. Similarly, for the CFI vs. CDI solutions, they all provide non-color-saturating light. The color fidelity of the solutions are presented in terms of CFI and CRI-S, CRI-D respectively in FIGS. 9A & 9B. The solutions provide a similar evaluation of the color rendition properties, except that CFI is more sensitive and distinguishing than CRI-S, D. Sample results of the color-dulling model and the color-saturation model are presented in Table II & Table III, respectively.

TABLE II

Results for tunable color dulling illumination

| | Luminous flux (lumen) | | | | Color quality indexes | | | |
|---|---|---|---|---|---|---|---|---|
| No. | Red | Green | Blue | White | CDI | CFI | CRI-D | CSI |
| D1/S1 | 182.7 | 326.6 | 138.9 | 1947.2 | 0.2 | 87.3 | 96.2 | 0.2 |
| D2 | 132.1 | 244.5 | 151.4 | 2247.2 | 12.1 | 74.9 | 92.4 | 0 |
| D3 | 122.9 | 187.1 | 128.0 | 2284.4 | 18.4 | 66.2 | 90.5 | 0 |
| D4 | 93.1 | 72.7 | 145.2 | 2417.3 | 23.6 | 57.8 | 89.1 | 0 |
| D5 | 46.4 | 25.2 | 146.1 | 2793.7 | 38.8 | 43.8 | 84.0 | 0 |
| D6 | 0.0 | 2.0 | 93.9 | 2883.1 | 50.8 | 30.0 | 77.1 | 0 |

TABLE III

Results for tunable color saturating illumination

| | Luminous flux (lumen) | | | | Color quality indexes | | | |
|---|---|---|---|---|---|---|---|---|
| No. | Red | Green | Blue | White | CSI | CFI | CRI-D | CDI |
| D1/S1 | 182.7 | 326.6 | 138.9 | 1947.2 | 0.2 | 87.3 | 96.2 | 0.2 |
| S2 | 243.9 | 535.6 | 154.5 | 1757.1 | 12.5 | 74.1 | 93.6 | 1.8 |
| S3 | 306.6 | 524.8 | 160.5 | 1726.0 | 22.1 | 58.2 | 88.6 | 0.8 |
| S4 | 307.5 | 551.8 | 176.5 | 1609.4 | 27.3 | 51.4 | 87.0 | 1.1 |
| S5 | 352.9 | 612.4 | 165.6 | 1451.8 | 40.6 | 41.2 | 82.4 | 0.7 |
| S6 | 460.9 | 871.7 | 181.6 | 1068.5 | 54.9 | 25.1 | 71.7 | 0.8 |

The optimization result was applied to a color rendition experiment, wherein a four-channel LED illumination device was mounted on top of a plastic cabinet pointing downward. The cabinet was sprayed with matt white paint inside to obtain good mixing of light in the interior space. The optimized SPDs were applied to the device, respectively. With the SPD of the illumination device changing gradually from highest color-dulling ability (D6) to highest color-saturating ability (S6), the saturation level on the object(s) changed from least to the highest.

The same system and optimization procedures of the flash light described above can also be applied to general flash or pulse lighting applications. For instance, the flash lighting illumination systems described herein may be provided to generate sampling flashes to facilitate characterizing an illumination target, and/or to generate illumination pulses, to facilitate providing an optimized, combined light on an illumination target, in a manner such as described above.

Figure 10:
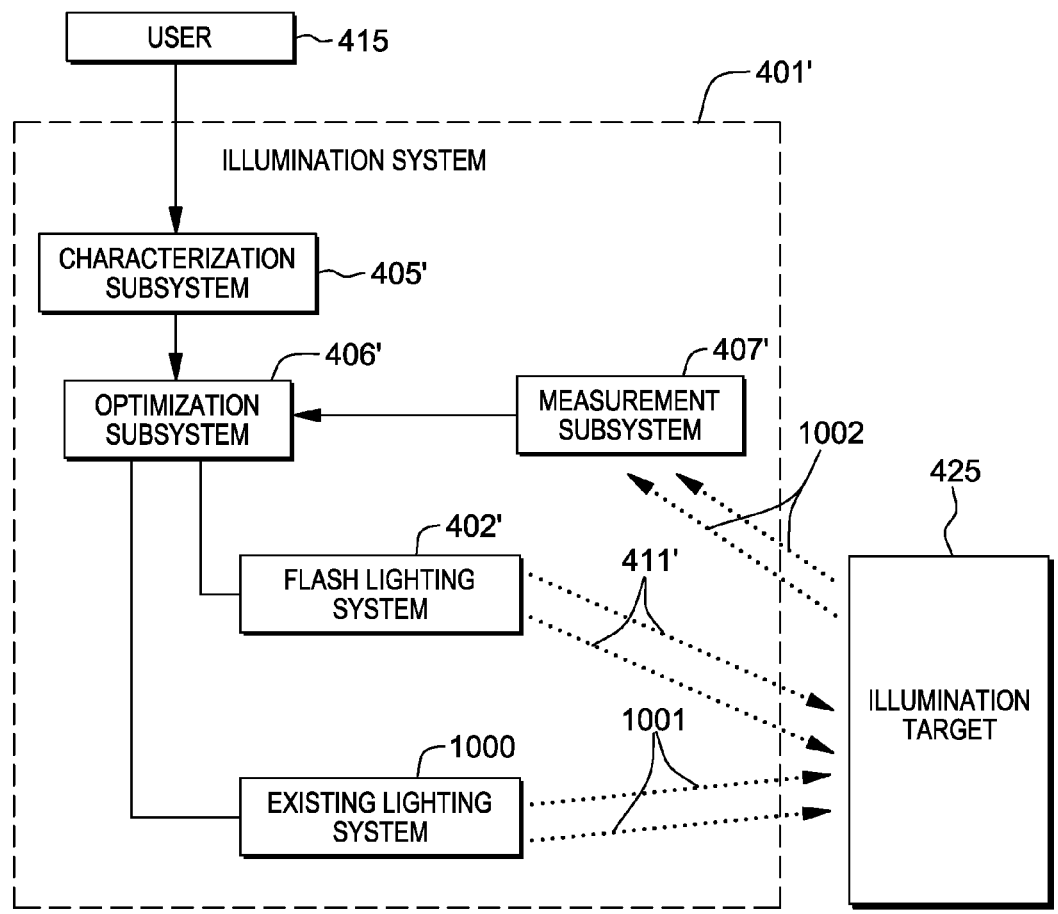
FIG. 10 depicts another embodiment of a system for generating an optimized flash light(s), in accordance with one or more aspects of the present invention.

By way of example, FIG. 10 depicts an alternate embodiment of an illumination system 401' which includes a flash lighting illumination system 402' and an existing lighting system 1000, which may, for instance, comprise a continuous or constant light source or a varying-with-time, non-pulsed, light source, which provides an existing light 1001 on or around target 425. Target 425 may be sampled using a flash light 411', or sampling flash, generated by flash lighting system 402'. During illumination of target 425 by flash light 411', one or more reflection characteristics of target 425 may be measured by measurement subsystem 407', and then transferred to optimization subsystem 406', for use (for instance) in enhancing illumination of the target, as explained above. Depending on the implementation, a user 415 may select desired lighting characteristics for target 425 through characterization subsystem 405', wherein the characteristics may be quantified, for instance, by color quality indexes, CCT, and/or illuminance, as described above. Using similar processing to that described above, optimization subsystem 406' may determine an optimized spectral power distribution for existing light being produced by existing lighting system 1000 for the characterized target. The existing lighting system 1000 may generate an existing light 1001 with the optimized spectral power distribution for target 425. The waveform and sequence of the sample (and/or illumination) flash lighting can follow various patterns, such as those illustrated in FIGS. 1 & 2. Note that although not shown, the illumination system 401' of FIG. 10 could be part of a viewing/imaging system similar to the illumination system of FIG. 4. For instance, the viewing/imaging system, comprising the illumination system, could be or include any type of imaging device or system, such as a camera, a phone camera, a video recorder, a medical imaging system, etc.

As one example, existing lighting system 1000 could be provided to generate a predetermined, continuous light, based on a user's selection of a particular lighting application. In this implementation the existing lighting system is subject to optimization system 406' for selection of the optimized spectral power distribution for the existing light. In one implementation, the flash lighting illumination system 402' produces one or more sample pulses, for instance, using light-emitting diodes, as described above, with illumination being provided by the existing illumination system 1000. The sampling flash(es) assist the measurement subsystem 407' to better characterize the illumination target, and therefore facilitates the system determining which of multiple predetermined spectral power distributions for the continuous lighting system should be generated.

By way of further example, illumination system 400' of FIG. 10 could be configured to generate, in addition to one or more sampling flashes, illumination flashes, for use in facilitating illumination of the target, producing a combined light at the target comprising the illumination flashes and the existing light. In such a case, the optimization processing for the illumination system could be similar to that described above in connection with FIG. 5, wherein the existing light might substitute for the ambient and/or background light in the example described above, depending on location. Assuming that the flash lighting illumination system 402' is to provide illumination flashes, then a goal of the optimization may be to determine a suitable spectral power distribution for the flash light source, so that in combination with the spectral power distribution on the existing lighting system, a combined light is provided which optimizes lighting to the target, in a manner similar to that described above in connection with FIG. 5. Using the processing flow of FIG. 5, then by way of example, once the illumination object is determined, the illuminance of the continuous or master source and the illuminance of the desired, combined light may be obtained. The determined illumination target, and luminous values may be used to determine a desired illuminance from the flash lighting system or slave light source.

Using Model I described above, the corresponding luminous flux and spatial distribution of the flash light can be determined. The spectrum of the existing light is obtained, and the desired illumination task is also obtained, for instance, in terms of CCT and color quality indexes. The luminous information, spectrum information, and illumination task attributes work together and form constraints on the spectral power distribution for the flash light. Under these constraints, the spectral power distribution of the flash light is determined. Using, for instance, Model II described above, the spectrum of the combined light, that is, the combination of existing light and flash light in the example of FIG. 10, may be determined, having already been obtained. The CCT and color quality indexes of the combined light are then determined and compared, with the obtained expectations. If the comparison matches, then the optimized spectral power distribution for the flash light has been identified. Otherwise, the process repeats, with a new possible spectral power distribution for the flash light being determined. As a result, the flash light may change its output in accordance with the existing light provided by the existing lighting system to form a constantly-optimized, combined light on the illumination target, subject to user-desired characterizations or expectations.

In another aspect, a flash lighting system such as described herein may be employed to emit a series of flash lights to illuminate a target which may be moving or changing in time such that the existing light on the target is changing. In this case, the sequence of flash lights may include flash lights with different spectral power distributions varying between adjacent flashes, or varying in any desired pattern, such as varying every two flashes, every three flashes, etc. The desired time sequence of spectral power distribution (SPD) changes may be dependent on the lighting environment around the target to be illuminated.

Figure 11A:
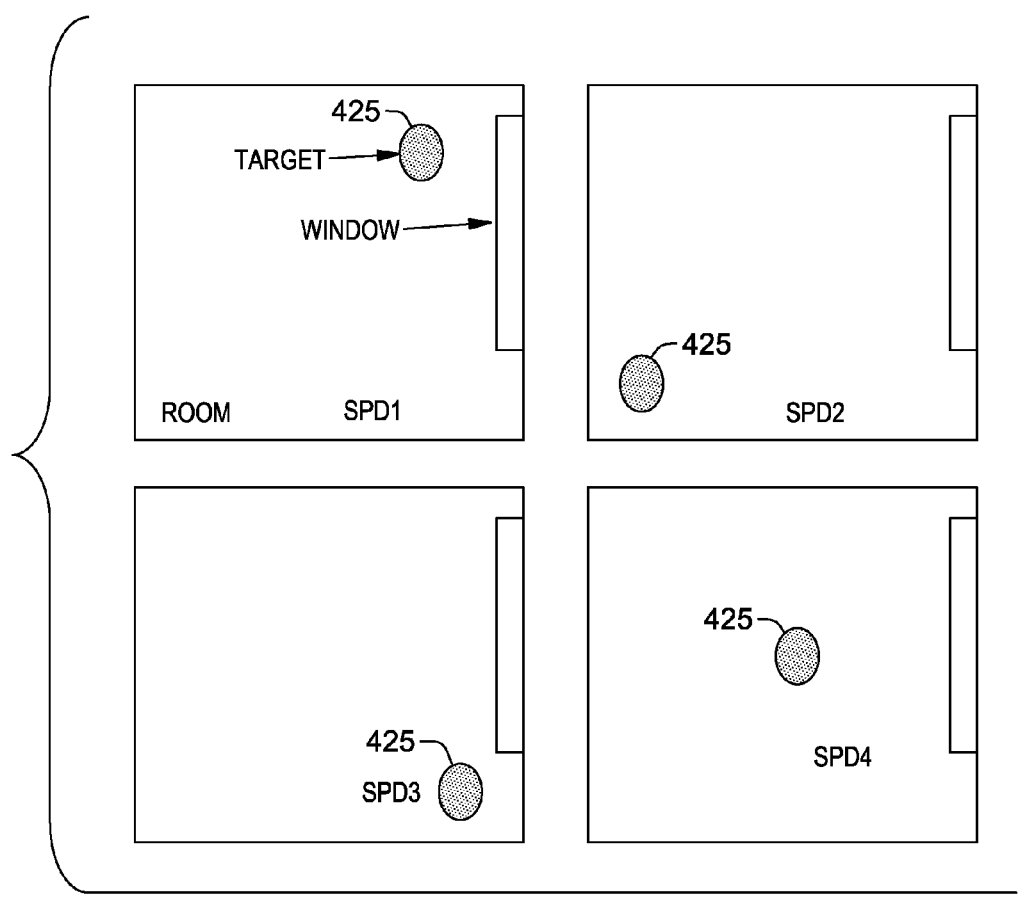
FIG. 11A depicts an illustrative, moving illumination target within a space, which may result in different optimized flash light spectral power distributions of illumination within a sequence of flash lights, in accordance with one or more aspects of the present invention.

As illustrated in FIG. 11A, the illumination target may be moving inside of a space relative to, for instance, light coming through a window, such that different spectral powers of distribution, SPD1, SPD2, SPD3, SPD4, of the existing light are obtained as a function of time. In this example, the background light around the target will vary based on the position of the target. As a dynamic compensation, the flash lighting system described herein is able to sense the real-time ambient light and background light on the target, and therefore generate a timed sequence of flash lights with different spectral power distributions as appropriate to provide combined light with the desired color attributes, for (for instance) imaging by an imaging system comprising the flash lighting system, such as a camera, phone camera, video recorder, medical imaging system, etc.

Figure 11B:
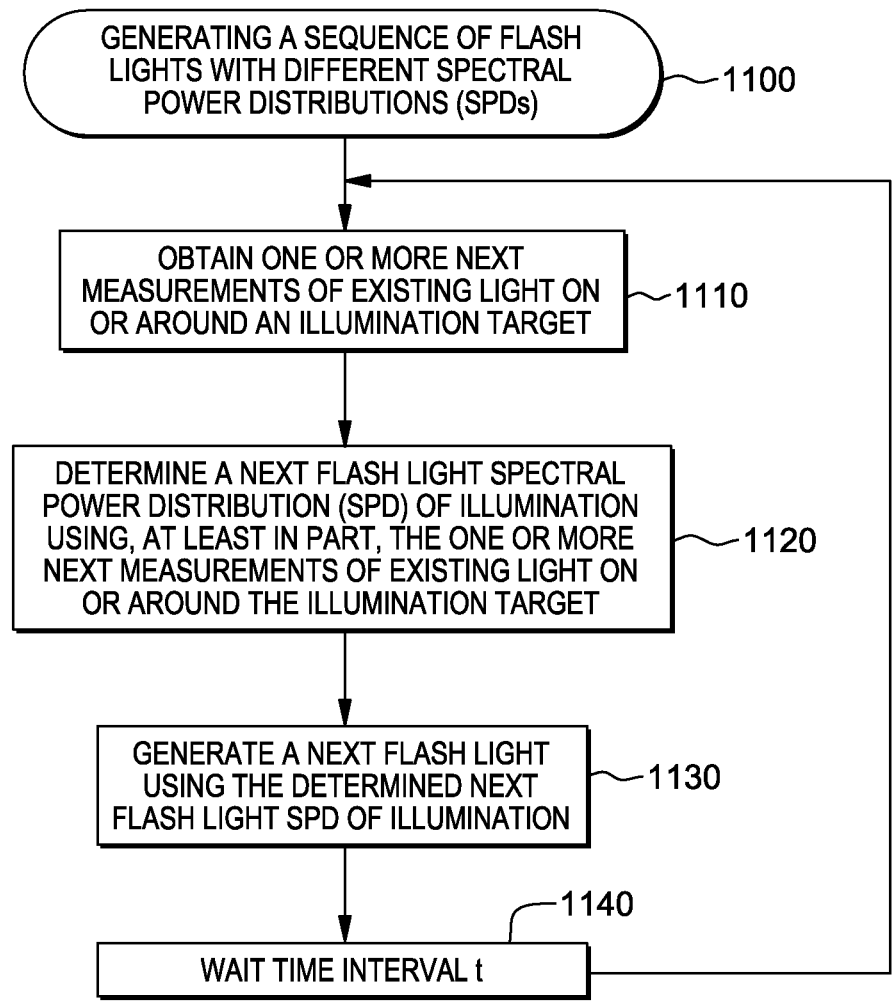
FIG. 11B depicts one embodiment of a process for generating a sequence of flash lights with spectral power distributions which differ as a function of time due to changing existing light conditions on or around an illumination target, in accordance with one or more aspects of the present invention.

FIG. 11B depicts one embodiment of the process for producing a sequence of light pulses with different spectral power distributions 1100, in accordance with one or more aspects of the present invention. The process includes obtaining one or more next measurements of existing light on or around an illumination target 1110, which may include obtaining measurements of ambient light, as well as background light on the illumination target, as described above. A next flash light spectral power distribution (SPD) of illumination is determined using, at least in part, the one or more next measurements of existing light on or around the illumination target 1120. This may be accomplished in a manner similar to that described above in connection with FIGS. 4 & 5. A next flash light is then generated using the determined, next flash light spectral power distribution of illumination 1130, and processing may wait a defined time interval 1140, before repeating the process for the next flash light in the sequence of flash lights being generated. In this manner, and as one example only, each flash light in the sequence may have a different spectral power distribution dependent, for example, on the existing light on or around the target at the time of illumination.

Figure 12A:
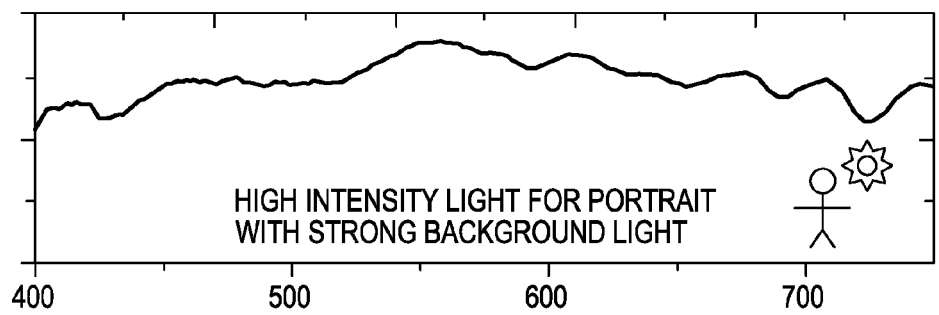
FIGS. 12A-12D depict exemplary, predefined, flash light spectral power distributions of illumination, which may be provided with an illumination system, and dynamically selected among based on existing lighting conditions on an illumination target to generate a customized flash light, in accordance with one or more aspects of the present invention.
Figure 12B:
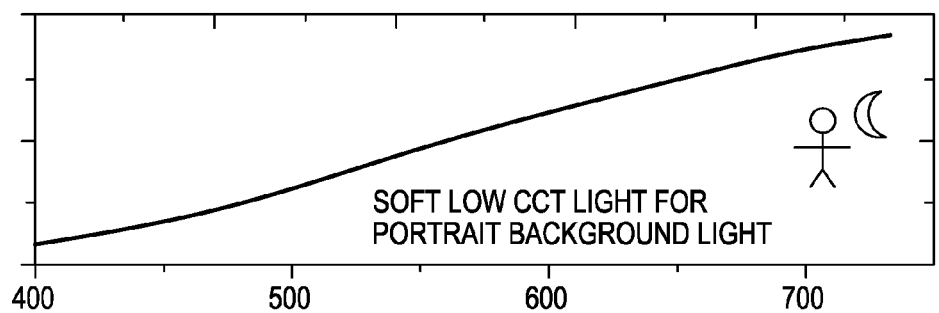
Figure 12C:
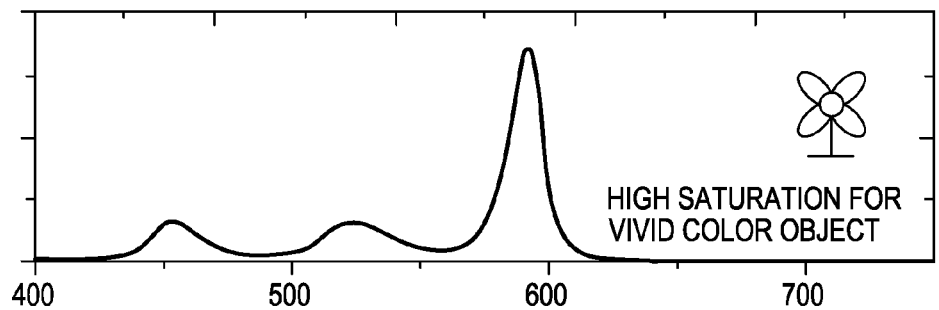
Figure 12D:
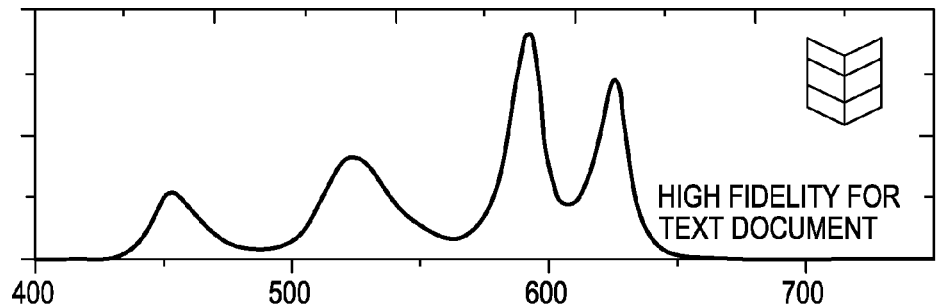

In a further aspect, except for a real-time compensation of an existing light implementation, the illumination systems described herein which generate flash lights, may be provided with a set of selectable, predetermined spectral power distributions for varied applications. FIGS. 12A-12D depict examples of predetermined spectral power distributions for a flash light, which may be stored in memory within the illumination system and made available for user selection. For instance, as illustrated in FIG. 12A, when a user selects a scenario wherein the target to be viewed or imaged is in strong background light, then the illumination system may automatically generate a flash light with high-intensity light that mimics the strong background light or sunlight, in order to better illuminate the target. If the scenario for the viewing or imaging is of a target in a low-light condition, then the illumination system could automatically generate a flash light with a soft, low-CCT attribute of low intensity, as illustrated in FIG. 12B, in order to better reveal correct colors of the target. For vivid color targets, such as flowers or fruits, one or more predetermined spectral power distributions may be provided with sufficient red-spectral components, as shown in FIG. 12C, in order to reveal vivid colors of such a target. In the scenario of illuminating text documents, a high-CTT and high fidelity spectral power distribution may be predetermined, to differentiate details of the text, as illustrated in FIG. 12D.

Figure 12E:
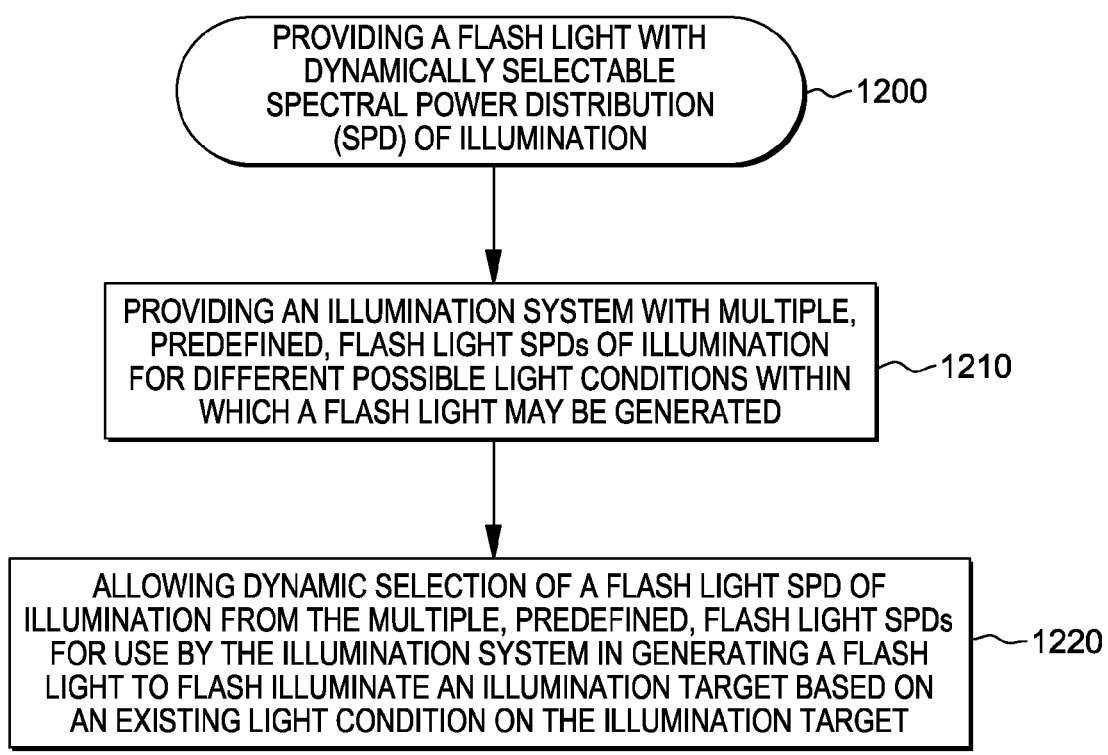
FIG. 12E depicts one embodiment of a process for providing an illumination system with multiple, predefined flash light power spectral power distributions of illumination, in accordance with one or more aspects of the present invention.

FIG. 12E depicts one embodiment of the process described above. Providing a flash light with dynamically-selectable, spectral power distribution (SPD) of illumination 1200 may include providing an illumination system with multiple, predefined flash light spectral power distributions of illumination for different possible light conditions within which a flash light may be generated for illuminating a target 1210. In addition, the method includes allowing dynamic selection of a flash light SPD of illumination from the multiple, predefined flash light SPDs for use by the illumination system in generating a flash light to flash illuminate an illumination target based on an existing light condition on the illumination target 1220. In one example, this may include allowing a user to select a desired flash light SPD of illumination from the multiple, predefined flash light SPDs provided with the illumination system. As in the other embodiments described herein, the illumination system of FIGS. 12A-12E could be implemented within a viewing/imaging system, such as a camera, camera phone, video recorder, medical imaging system, etc., to facilitate, for instance, the capture of a photograph, or other type of image, of the illumination target.

Advantageously, provided herein are various methods and systems for facilitating illumination of a target. For instance, in one or more aspects, a method is provided which includes: obtaining one or more measurements of existing light on or around an illumination target; ascertaining one or more desired color attributes for a combined light to be provided on the illumination target, the combined light including the existing light and a flash light to be generated; determining a flash light spectral power distribution of illumination which achieves a combined light spectral power distribution of illumination on the illumination target having the one or more desired color attributes, the determining using, in part, the one or more measurements of the existing light, and the ascertained one or more desired color attributes for the combined light; and generating the flash light with the determined flash light spectral power distribution of illumination to provide the combined light on the illumination target having the combined light spectral power distribution of illumination with the one or more desired color attributes.

Numerous enhancements on the above-noted process are presented herein. For instance, the existing light might include ambient light and background light, with the obtaining including obtaining one or more measurements of the ambient light and one or more measurements of the background light. In such implementations, the one or more measurements of the ambient light might include measurement of illuminance of the ambient light, and the one or more measurements of the background light could include measurement of illuminance of the background light. The method may further include determining a desired illuminance for the flash light from the illuminance of the ambient light and the illuminance of the background light, and from the desired illuminance, determining a luminous flux for the flash light.

In one or more implementations, generating the flash light spectral power distribution of illumination may include: selecting one possible flash light spectral power distribution and determining therefrom one possible combined light spectral power distribution; and determining the one or more color attributes for the one possible combined light spectral power distribution and comparing those one or more color attributes against the desired one or more color attributes for the combined light, and where the comparison produces a substantial match, outputting the one possible flash light spectral power distribution as the determined flash light spectral power distribution, otherwise, selecting another possible flashlight spectral power distribution, and repeating the determining the one or more color attributes and the comparing thereof.

In certain embodiments, the one or more desired color attributes might include one or more of a correlated color temperature (CCT), a spectral color quality measurement (SCQM), or a color rendition index (CRI). For instance, the one or more desired color attributes might include the color rendition index (CRI) with saturation (S) and dulling (D) indexes. In one particular embodiment, the one or more desired color attributes may include a correlated color temperature (CCT), a spectral color quality measurement (SCQM), and a color rendition index (CRI), and the spectral color quality measurement (SCQM) may include at least one of a color-dulling index (CDI), or a color saturation index (CSI).

In certain embodiments, the method may further include evaluating a reflection spectrum of the illumination target, and adjusting the determined flash light spectral power distribution of illumination to enhance the image resolution of the imaging target, using the evaluated reflection spectrum. Further, the one or more desired color attributes for the combined light to be provided may be, at least in part, user-selectable. The existing light may include ambient light on or around the illumination target, and a background light on or around the illumination target, and determining the flash light spectral power distribution of illumination matches one or more lighting qualities of the combined light to one or more lighting qualities of the background light.

In one or more embodiments, the existing light includes, at least in part, a continuous light being generated and provided to illuminate the illumination target. In other embodiments, the existing light may include, at least in part, a time-varying, non-pulsed light being generated and provided to illuminate the illumination target.

Generating the flash light may include using multiple light-emitting diodes (LEDs) of different color to generate the flash light with the determined flash light spectral power distribution of illumination, the multiple light-emitting diodes including diodes of at least one of different spectral power distributions (SPDs), different correlated color temperatures (CCTs), or different color rendition indexes (CRIs). By way of further example, the generating may include using multiple light-emitting diodes (LEDs) of different color to generate the flash light with a determined flash light spectral power distribution of illumination, where the generating includes providing at least two subsets of light-emitting diodes of the multiple light-emitting diodes with different drive intensities. In such a case, the one or more desired color attributes for the combined light to be provided may be, at least in part, user-selectable, and user selection of the one or more desired color attributes for the combined light results in changing relative intensities of a first set of light-emitting diodes having a high-dulling index, and/or a second subset of light-emitting diodes having a high-saturation index. The multiple light-emitting diodes may include multiple monochromatic light-emitting diodes, or multiple phosphor-covered light-emitting diodes.

The method may further include imaging or viewing the illumination target commensurate with providing the combined light on the illumination target having the combined light spectral power distribution of illumination with one or more desired color attributes. For instance, the imaging or viewing may be performed via a camera, video recorder, catheter, etc.

Note that the above-noted enhancements on the outlined process may be separately utilized or employed in any desired combination. Additionally, the various embodiments and enhancements disclosed herein may be implemented as part of a viewing/imaging system comprising any type of imaging device or system, such as a camera, phone camera, video recorder, medical imaging system, etc., which may include, for instance, an input control system that allows user-selection of one or more imaging parameters, such as one or more color attributes for a combined light to be presented on an illumination target. The claims presented herein are intended to encompass any such combinations.

In another aspect, a method is provided which includes: obtaining measurements of existing light on or around an illumination target as a function of time; determining multiple flash light spectral power distributions of illumination using, at least in part, the obtained measurements of the existing light on or around the illumination target; and generating multiple flash lights using the determined, multiple flash light spectral power distributions to provide a sequence of flash lighting of the illumination target, wherein at least two flash lights of the multiple flash lights have different spectral power distributions of illumination which correlate to variation in the measurements of the existing light on or around the illumination target. The existing light may include ambient light and background light, and the obtaining may include obtaining one or more measurements of the ambient light, and one or more measurements of the background light.

In one or more embodiments, the method may further include ascertaining one or more desired color attributes for a combined light to be provided on the illumination target, the combined light including the existing light and the sequence of flash lighting of illumination of the target, wherein the determining includes determining the multiple flash light spectral power distributions of illumination using, at least in part, the ascertained one or more desired color attributes for the combined light. For instance, the one or more desired color attributes may include one or more of a correlated color temperature (CCT), a spectral color quality measurement (SCQM), or a color rendition index (CRI). The ascertaining, the obtaining, the determining, and the generating may be implemented within an imaging system, such as a camera, phone camera, video recorder, medical imaging system, etc., which allows the one or more desired color attributes for the sequence of combined light to be provided to, at least in part, be user-selectable.

In one or more implementations, the existing light includes an ambient light on or around the illumination target, and a background light on or around the illumination target, and the determining of the multiple flash light spectral power distributions of illumination matches within a predefined percentage one or more lighting qualities of the sequence of combined light to one or more lighting qualities of the background light. In one or more implementations, the generating may include using multiple light-emitting diodes of different color to generate the sequence of flash lighting of the illumination target with the determined, multiple flash light spectral power distributions of the illumination. The multiple light-emitting diodes may include diodes of at least one of different spectral power distributions (SPDs), different correlated color temperatures (CCTs), or different color rendition indexes (CRIs).

In a further aspect, a method is provided herein which includes: providing an illumination system with multiple, predefined, flash light spectral power distributions of illumination for different possible lighting conditions within which a flash light may be generated by the illumination system; and allowing dynamic selection of a flash light spectral power distribution of illumination from the multiple, predefined, flash light spectral power distributions of illumination for use by the illumination system in generating a flash light to flash illuminate an illumination target based on an existing light condition on the illumination target.

In one or more embodiments of this aspect, the allowing may include allowing a user of the illumination system to dynamically select the flash light spectral power distribution of illumination from the multiple, predefined, flash light spectral power distributions of illumination. For instance, the illumination system may be part of an imaging system or device, such as a camera, phone camera, video recorder, medical imaging system, etc., which includes an input control system that allows user-selection of the flash light spectral power distribution of illumination from the multiple, predefined, flash light spectral power distributions of illumination. In certain embodiments, the input control system may comprise a user-controlled selector, such as a rotatable wheel, which allows a user to select which of the predetermined spectral power distributions are to be employed, either alone or in combination with selecting an intensity for the flash light to be generated for illumination of the illumination target.

Further, providing the illumination system with the multiple, predefined, flash light spectral power distributions of illumination may include using statistical color metrics to determine the multiple, predefined, flash light spectral power distributions of illumination for the illumination system. In one or more implementations, providing the illumination system with the multiple, predefined, flash light spectral power distributions of illumination may include using a color rendition index (CRI) with saturation (S) and dulling (D) indexes to determine the multiple, predefined, flash light spectral power distributions of illumination for the illumination system.

Provided herein in another aspect is a method of generating pulse light, which includes: characterizing the ambient light; characterizing the desired combined light; determining a desired, combined light spectral power distribution for illumination; and generating the corresponding flash light so that its combination with the ambient light produces the desired, combined light spectral power distribution.

Also provided is a system for generating pulse light, which includes: a measurement system for obtaining characterization of ambient light; a characterization system for characterizing the target flash light using statistical color quality metrics (SCQM) or color rendition index (CRI) implemented with indexes of S (saturation) or D (dulling), subjected to user selection; an optimization system for determining the spectral power distribution of the flash light, according to the sensed ambient light and characterized target light; and an illumination system for generating white light having the optimized spectral power distribution, wherein the illumination system contains multiple color LEDs.

In a further aspect, a system is provided for generating flash light and continuous light, the system comprising: a flash lighting source for generating sampling illumination that characterizes the target; a measurement system for obtaining characterization of the target; a characterization system for characterizing the target flash light using statistical color quality metrics (SCQM) or color rendition index (CRI) implemented with indexes of S (saturation) or D (dulling), subjected to (for instance) user selection; an optimization system for determining the spectral power distribution of the flash light; and continuous lighting system with a changeable spectral power distribution (SPD) for generating light having the optimized SPD, wherein the illumination system contains multiple color LEDs.

In general, systems corresponding to and/or incorporating the above-summarized methods and features are also presented and claimed herein.

Advantageously, advanced LED technology has led to the development of light sources with various spectral power distributions (SPD). With the help of an intelligent control system, the intensity of different broad-band LEDs can be arbitrarily changed or optimized as described herein to constitute desirable spectra. This flexibility allows for lighting systems with high color quality and/or tunable spectral power distribution.

Therefore, a target illuminance and color temperature could be achieved by a combination of ambient light and optimized spectral power distribution of the flash lighting source. More importantly, the flash lighting source can provide various visual effects on the targets, in corresponding to different lighting needs. These visual effects could be quantified by color quality indexes together with illuminance and CCT.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs.

As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
    obtaining one or more measurements of existing light on or around an illumination target, the one or more measurements including one or more measurements of background light of the illumination target;
    ascertaining one or more desired color attributes for a combined light to be provided on the illumination target depending on optical properties of the illumination target determined by a characterization subsystem of an illumination system facilitating implementing the method, the combined light comprising the existing light and a flash light to be generated;
    determining a particular flash light spectral power distribution of illumination which achieves within a defined percentage a combined light spectral power distribution of illumination on the illumination target having the one or more desired color attributes of the illumination target, the determining using, in part, the one or more measurements of the existing light, the ascertained one or more desired color attributes for the combined light and an automatic iterative evaluation of multiple possible flash light spectral power distributions of illumination to ascertain the particular flash light spectral power distribution of illumination which achieves within the defined percentage the combined light spectral power distribution of illumination on the illumination target; and
    generating the flash light with the particular flash light spectral power distribution of illumination to provide the combined light on the illumination target having the combined light spectral power distribution of illumination on the illumination target.

2. The method of claim 1, wherein the existing light comprises an ambient light and the background light, and the obtaining comprises obtaining one or more measurements of the statistical color quality of the ambient light and one or more statistical color quality measurements of the background light and of the target, wherein the one or more measurements of the ambient light comprise measurement of illuminance of the ambient light, and the one or more measurements of the background light comprise measurement of illuminance of the background light, and wherein the method further comprises determining a desired illuminance for the flash light from the illuminance of the ambient light, the illuminance of the background light and the optical properties of the illumination target determined by the characterization subsystem, and from the desired illuminance, determining a luminous flux for the flash light.

3. The method of claim 2, further comprising using the determined luminous flux for the flash light as a constraint for constituting the multiple possible flash light spectral power distributions of illumination.

4. The method of claim 3, wherein determining the particular flash light spectral power distribution of illumination comprises:
    selecting one possible flash light spectral power distribution of illumination and determining therefrom one possible combined light spectral power distribution of illumination; and
    determining the one or more color attributes for the one possible combined light spectral power distribution and comparing those one or more color attributes against the desired one or more color attributes for the combined light depending on the optical properties of the illumination target determined by the characterization subsystem, and where the comparison produces a match within the predefined percentage, outputting the one possible flash light spectral power distribution as the particular flash light spectral power distribution of illumination, otherwise, selecting another possible flash light spectral power distribution of illumination and repeating the determining the one or more color attributes and the comparing thereof.

5. The method of claim 1, wherein the one or more desired color attributes comprise a spectral color quality measurement (SCQM).

6. The method of claim 1, wherein the one or more desired color attributes comprise a color rendition index (CRI) with saturation (S) and dulling (D) indexes.

7. The method of claim 1, wherein the one or more desired color attributes comprise a correlated color temperature (CCT), a spectral color quality measurement (SCQM), and a color rendition index (CRI), and wherein the spectral color quality measurement (SCQM) includes at least one of a color dulling index (CDI) or a color saturation index (CSI).

8. The method of claim 1, wherein the one or more desired color attributes for the combined light to be provided are, in part, user-selectable and in part, determined by the iterative evaluation.

9. The method of claim 1, wherein the existing light comprises, at least in part, a continuous or pulsed, or time varying light being generated and provided to illuminate the illumination target.

10. The method of claim 1, wherein the generating comprises using multiple light-emitting diodes (LEDs) of different color to generate the flash light with the determined flash light spectral power distribution of illumination, the multiple light-emitting diodes comprising diodes of at least one of different spectral power distributions, different correlated color temperatures (CCTs), or different color rendition indexes CRI-D and CRI-S.

11. The method of claim 1, further comprising at least one of imaging or viewing the illumination target commensurate with providing the combined light, including that of the desired flash light, on the illumination target having the combined light spectral power distribution of illumination with the one or more desired color attributes, depending on the optical properties of the illumination target determined by the characterization subsystem, the one or more desired color attributes being one or more desired color measurement attributes or color quality measurement attributes.

12. A method comprising:
obtaining measurements of existing light on or around an illumination target as a function of time, the one or more measurements including one or more measurements of background light of the illumination target;
determining multiple flash light spectral power distributions of illuminations using, at least in part, the obtained measurements of the existing light on or around the illumination target and optical properties of the illumination target determined by a characterization subsystem;
providing an illumination system with multiple, predefined, flash light spectral power distributions of illumination for different possible light conditions within which a flash light may be generated by the illumination system, the illumination system comprising the characterization subsystem; and
allowing dynamic selection of a particular flash light spectral power distribution of illumination from the multiple, predefined, flash light spectral power distributions of illumination for use by the illumination system in generating a flash light to flash illuminate an illumination target based on existing light conditions on the illumination target, and the optical properties of the illumination target determined by the characterization subsystem, wherein at least two flash lights have different spectral power distribution of illumination which correlate to variation in the color quality measurements of the existing light on or around the illumination target.

13. The method of claim 12, wherein the existing light comprises an ambient light and the background light, and the obtaining comprises obtaining one or more measurements of the ambient light and one or more measurements of the background light as a function of time and the optical properties of the illumination target.

14. The method of claim 12, further comprising:
ascertaining one or more desired color attributes for a combined light to be provided on the illumination target, the combined light comprising the existing light and the sequence of flash lighting of illumination of the target, and wherein the determining comprises determining the multiple flash light spectral power distributions of illumination using, at least in part, the ascertained one or more desired color attributes for the combined light depending on the optical properties of the illumination target determined by the characterization subsystem.

15. The method of claim 14, wherein the one or more desired color attributes comprise one or more of a spectral color quality measurement (SCQM), or a color rendition index (CRI) with saturation (S) and dulling (D) indexes.

16. The method of claim 14, wherein the ascertaining, the obtaining, the determining, and the generating are implemented within a camera, and one or more desired color attributes for the sequence of combined light to be provided are, in part, user-selectable, and in part, determined via the dynamic selection.

17. The method of claim 14, wherein the existing light comprises an ambient light on or around the illumination target, and a background light on or around the illumination target, and the determining the multiple flash light spectral power distributions of illumination matches within a predefined percentage one or more lighting qualities of the sequence of combined light to one or more lighting qualities of the background light.

18. The method of claim 12, wherein the generating comprises using multiple light-emitting diodes (LEDs) of different color to generate the sequence of flash lighting of the illumination target with the determined multiple flash light spectral power distributions of illumination, the multiple light-emitting diodes comprising diodes of at least one of different spectral power distributions (SPDs), different correlated color temperatures (CCTs), or different color quality measurements.

19. The method of claim 12, wherein the allowing comprises allowing a user of the illumination system to dynamically select the flash light spectral power distribution of illumination from the multiple, predefined, flash light spectral power distributions of illumination.

20. A system comprising:
an illumination system, the illumination system comprising:
one or more sensors to obtain one or more measurements of existing light on or around an illumination target, the one or more measurements including one or more measurements of background light of the illumination target;
a characterization subsystem for ascertaining one or more desired color attributes or color quality attributes for a combined light to be provided on the illumination target, depending on optical properties of the illumination target, the combined light comprising the existing light and a flash light to be generated, and the characterization subsystem ascertaining the optical properties of the illumination target;
an optimization subsystem for determining a particular flash light spectral power distribution of illumination which achieves within a defined percentage a combined light spectral power distribution of illumination on the illumination target having the one or more desired color attributes or color quality attributes, the determining using, in part, the one or more measurements of the existing light, the ascertained one or more desired color attributes for the combined light, and an automatic iterative evaluation of multiple possible flash light spectral power distributions of illumination to ascertain the particular flash light spectral power distribution of illumination which achieves within the defined percentage the combined light spectral power distribution of illumination on the illumination target; and
a flash lighting system for generating the flash light with the particular flash light spectral power distribution of illumination to provide the combined light on the illumination target having the combined light spectral power distribution of illumination on the illumination target.

21. The system of claim 20, wherein the illumination system comprises a stroboscopic illumination system for generating a series of flash lights.

* * * * *